United States Patent
Hung et al.

(10) Patent No.: US 10,680,535 B2
(45) Date of Patent: Jun. 9, 2020

(54) COMB-DRIVE ACTUATOR

(71) Applicant: OPUS MICROSYSTEMS CORPORATION, Taipei (TW)

(72) Inventors: Chang-li Hung, Taipei (TW); Ta-wei Lin, Taipei (TW); Kai-yu Jiang, Taipei (TW)

(73) Assignee: OPUS MICROSYSTEMS CORPORATION, Taipei (TW)

( * ) Notice: Subject to any disclaimer, the term of this patent is extended or adjusted under 35 U.S.C. 154(b) by 259 days.

(21) Appl. No.: 15/232,807

(22) Filed: Aug. 10, 2016

(65) Prior Publication Data

US 2017/0044003 A1 Feb. 16, 2017

(30) Foreign Application Priority Data

Aug. 14, 2015 (TW) .............................. 104126549 A

(51) Int. Cl.
*H02N 1/08* (2006.01)
*H02N 1/00* (2006.01)

(52) U.S. Cl.
CPC .................................. *H02N 1/008* (2013.01)

(58) Field of Classification Search
CPC .......... H02N 1/00; H02N 1/002; H02N 1/008; G02B 26/0841; B81B 3/0021; B81B 3/004; B81B 2201/033; B81B 2203/0136; B81B 2203/0154; B81B 2203/058
USPC ........... 310/300, 308, 309; 359/199.2, 200.6, 359/225.1
See application file for complete search history.

(56) References Cited

U.S. PATENT DOCUMENTS 7,071,109 B2 * 7/2006 Novotny ............ G02B 26/0841
                                                          438/692
7,242,129 B2    7/2007 Kim et al.
(Continued)

FOREIGN PATENT DOCUMENTS

TW          M404496 U        5/2011
TW          M490695          6/2011
(Continued)

OTHER PUBLICATIONS

Friese, Machine Translation of WO2009124608, Oct. 2009.*

*Primary Examiner* — Quyen P Leung
*Assistant Examiner* — Eric Johnson
(74) *Attorney, Agent, or Firm* — Mark M. Friedman

(57) ABSTRACT

A vertical comb-drive actuator comprising a support base and a movable body is described. The support base comprises first comb electrodes and a first surface wherein the first comb electrodes extend from the first surface. The movable body attached to the support base comprises second comb electrodes and a second surface wherein the second comb electrodes extend from the second surface. The movable body may rotate about a rotation axis and the first comb electrodes are interdigitated with the second comb electrodes correspondingly. The second comb electrodes extend along a first direction, the rotation axis extends along a second direction, and the first comb electrodes extend along a third direction. The distance between the first lateral face of the first comb electrode and the second surface is shorter than the second length defined as the distance between the end surface of the second comb electrode and the second surface.

13 Claims, 18 Drawing Sheets

(56) References Cited

U.S. PATENT DOCUMENTS

| | | | | |
|---|---|---|---|---|
| 7,863,799 | B1* | 1/2011 | Godil | H02N 1/006 310/308 |
| 9,306,475 | B1* | 4/2016 | Ba-Tis | H02N 1/006 |
| 2004/0155556 | A1* | 8/2004 | Onoda | H02N 1/006 310/309 |
| 2005/0185250 | A1* | 8/2005 | Novotny | G02B 26/0841 359/291 |
| 2006/0082250 | A1* | 4/2006 | Ko | G02B 26/0841 310/309 |
| 2007/0075033 | A1* | 4/2007 | Onoda | H02N 1/006 216/2 |
| 2007/0236767 | A1* | 10/2007 | Ko | G02B 26/0841 359/198.1 |
| 2011/0102871 | A1* | 5/2011 | Godil | G02B 26/0841 359/200.6 |
| 2011/0109194 | A1 | 5/2011 | Hung et al. | |
| 2011/0140569 | A1* | 6/2011 | Moidu | H02N 1/006 310/300 |
| 2011/0248601 | A1* | 10/2011 | Pirk | B81B 3/004 310/300 |
| 2011/0309717 | A1 | 12/2011 | Hung et al. | |
| 2012/0075685 | A1 | 3/2012 | Hofmann et al. | |

FOREIGN PATENT DOCUMENTS

| | | | |
|---|---|---|---|
| TW | 1464105 B | 12/2014 | |
| WO | WO 2008021144 A2 * | 2/2008 | H02N 1/008 |
| WO | WO 2009124608 A1 * | 10/2009 | H02N 1/008 |

* cited by examiner

COMB-DRIVE ACTUATOR

BACKGROUND OF THE INVENTION

Field of Invention

The present invention relates to an actuator, and more particularly to a vertical comb-drive actuator.

Description of Prior Art

Recently, devices manufactured by Micro Electro Mechanical Systems (MEMS) processing technology are extensively used in the fields of motion sensor and actuator applications, such as accelerometers, gyroscopes, or micro scanning mirrors which are composed of a plurality of micro structures with a variety of different design aspects, wherein the micro scanning mirrors are widely applicable to light reflection applications.

Please refer to FIGS. 1A through 1D. FIG. 1A is a partial schematic three-dimensional view of a conventional vertical comb-drive actuator 100; FIG. 1B is a partial schematic top view of the conventional actuator 100 in the FIG. 1A; and FIGS. 1C through 1D are schematic cross-sectional views of the actuator 100 along the line A-A' when a voltage signal is applied to the conventional actuator.

The actuator 100 includes a support base 102 and a movable body 104. The stationary electrodes 102a of the support base 102 are interdigitated with the movable electrodes 104a of the movable body 104, as shown in FIGS. 1A and 1B. When a power supply 103 provides a voltage signal to the support base 102 and the movable body 104, an electrical potential difference is established between the support base 102 and the movable body 104. The electrical potential difference generates an electrostatic force between the stationary electrodes 102a and the movable electrodes 104a, which includes the component "Fx" along direction "x" and the component "−Fz" along negative direction of "z" to cause a horizontal displacement in "x" direction and a rotational motion about a rotation axis 105 of the movable body 104, as shown in FIGS. 1B through 1D.

Specifically, the electrostatic force component "Fx" exerted on the movable body 104 induces horizontal displacement of the movable body 104 along the positive direction "+x" which is perpendicular to the rotation axis 105. In other words, the electrostatic force component "Fx" pulls the edge portions 106 of the movable electrodes 104a of the movable body 104 toward a root portion 108 of the stationary electrodes 102a. The electrostatic force "−Fz" is used to drive the movable body 104 to enable its vertical displacement along the negative direction of "z" which is perpendicular to the rotation axis 105 and the positive direction "x", and also to enable the clockwise rotation of movable body 104 about rotation axis 105, as shown in FIGS. 1B through 1D.

In FIGS. 1B through 1D, the electrostatic force "Fx" exerted on the movable body 104 will induce horizontal displacement of the movable body 104 along the positive direction "+x" during rotation which leads to poor motion quality of the movable body 104. Excessive horizontal displacement of the movable body 104 will cause electrical short between the movable electrodes 104a and the stationary electrodes 102a as the edge portions 106 of the movable electrodes 104a electrically contact the stationary electrodes 102a of the support base 102 during rotation, which will lead to damage of the actuator 100.

Consequently, there is a need to develop a novel vertical comb-drive actuator to solve the problems of the poor motion quality and the electrical short problem caused by excessive horizontal displacement during rotation motion of the movable body 104.

SUMMARY OF THE INVENTION

One objective of the present invention is to provide a vertical comb-drive actuator which reduces the horizontal displacement when the movable body rotates and also improves the rotation motion quality of the movable body.

According to the above objective, the present invention sets forth a vertical comb-drive actuator. The comb-drive actuator comprises: a support base, for setting up at least one first comb electrode and a first surface wherein the at least one first comb electrode extends from the first surface; and a movable body attached to the support base, including up at least one second comb electrode and a second surface wherein the at least one second comb electrode extends from the second surface. The movable body is allowed to rotate about a rotation axis and the at least one first comb electrode is interdigitated with the at least one second comb electrode; wherein the at least one second comb electrode extends along a first direction, the rotation axis extends along a second direction, the at least one first comb electrode extends along a third direction, the distance between a first lateral face of the first comb electrode of the support base and the second surface is shorter than a second length between the end surface of the second comb electrode of the movable body and the second surface, and the first lateral face along the first direction is disposed between a second lateral face of the first comb electrode and the end surface along the first direction.

In one embodiment, the first direction, the second direction, and the third direction are different directions.

In one embodiment, the first direction, the second direction, and the third direction are perpendicular to each other.

In one embodiment, when the movable body is not rotated in rest position, a first length of the first comb electrode along the first direction is shorter than the second length of the second comb electrode along the first direction and the first length is defined as the distance between the first lateral face and the second lateral face.

In one embodiment, when the movable body is not rotated in rest position, the distance between the first lateral face of the first comb electrode of the support base and the second surface is shorter than the second length between the end surface of the second comb electrode of the movable body and the second surface.

In one embodiment, when the movable body is not rotated in rest position, the areas of the first comb electrode and the second comb electrode projected onto the plane defined by the first direction and the third direction are either partially overlapped or not overlapped.

In one embodiment, when the movable body is rotated about the rotation axis, a first length of the at least one first comb electrode along the first direction is shorter than the second length of the at least one second comb electrode along the first direction.

In one embodiment, while the movable body is rotated about the rotation axis, the first lateral face of the at least one first comb electrode along the first direction is disposed between the lower edge of the end surface of the at least one second comb electrode and the second lateral face of the at least one first comb electrode wherein the lower edge is approaching the first lateral face of the at least one first comb electrode.

In one embodiment, the support base further comprises at least one third comb electrode extending from the first surface, and the distance between a third lateral face of the third comb electrode and the second surface of the second comb electrode is greater than the second length between the end surface of second comb electrode and the second surface.

In one embodiment, the first length of the at least one first comb electrode is shorter than a third length of the at least one third comb electrode along the first direction wherein the third length is defined as the distance between a third lateral face and a second lateral face of the third comb electrode along the first direction.

In one embodiment, the support base comprises two sets of the first comb electrode units, each set of the first comb electrode unit comprises a plurality of first comb electrodes, and the two sets of the first comb electrode units are disposed on the opposite sides of the rotation axis respectively.

In one embodiment, the movable body comprises two sets of the second comb electrode units, each set of the second comb electrode units comprises a plurality of second comb electrodes and the two sets of the second comb electrode units are disposed on the opposite sides of the rotation axis respectively.

In one embodiment, an electrical potential difference is applied between one of the two sets of the first comb electrode units and one of the two sets of the second comb electrode units to drive the movable body to rotate about the rotation axis.

In one embodiment, a periodically electrical potential difference is applied between the two sets of the first comb electrode units and the two sets of the second comb electrode units to drive the movable body to rotate about the rotation axis in a bidirectional and reciprocal oscillation motion.

In one embodiment, the two sets of the first comb electrode units on the opposite sides of the rotation axis are electrically isolated.

In one embodiment, the movable body is attached to the support base by torsion bars such that the movable body is allowed to rotate about the rotation axis of the torsion bars.

In one embodiment, the end surfaces of the at least one second comb electrodes are connected to each other.

In one embodiment, in two adjacent second comb electrodes, the second surface and the end surface of at least two adjacent comb electrodes of the second comb electrodes form a closed region.

In one embodiment, a first distance between the first lateral face of the first comb electrode and a third surface is equal to a second distance between the second lateral face of the first comb electrode and the second surface and wherein the third surface is opposite to the first lateral face inside the closed region.

In one embodiment, a first distance between the first lateral face of the first comb electrode and a third surface is not equal to a second distance between the second lateral face of the first comb electrode and the second surface and wherein the third surface is opposite to the first lateral face inside the closed region.

In another embodiment of the present invention, a comb-drive actuator, comprising a support base, comprising at least one first comb electrode, a first surface wherein the at least one first comb electrode extends from the first surface; and a movable body attached to the support base and comprising at least one second comb electrode and a second surface wherein the at least one second comb electrode extends from the second surface wherein the movable body is allowed to rotate about a rotation axis and the at least one second comb electrode is interdigitated with the at least one first comb electrode; wherein the at least one second comb electrode extends along a first direction, the rotation axis extends along a second direction, the at least one first comb electrode extends along a third direction, a distance between a first lateral face of the first comb electrode of the support base and a second surface is shorter than a second length defined as the distance between an end surface of the second comb electrode of the movable body and the second surface, and the first lateral face is disposed between a second lateral face of the first comb electrode and the end surface along the first direction; wherein the support base further comprises at least one third comb electrode extending from the first surface, and a distance between a third lateral face of the third comb electrode and the second surface is longer than the second length between the end surface of second comb electrode and the second surface.

In one embodiment, the first length of the at least one first comb electrode along the first direction is shorter than a third length of the at least one third comb electrode wherein the third length is defined as the distance between a third lateral face and a second lateral face of the third comb electrode along the first direction.

In one embodiment, the support base comprises two sets of the first comb electrode units, each set of the first comb electrode units comprises a plurality of first comb electrodes and the two sets of the first comb electrode units are disposed on the opposite sides of the rotation axis, and two sets of the third comb electrodes units, each set of the third comb electrode units comprises a plurality of third comb electrodes and the two sets of the third comb electrode units are disposed on the opposite sides of the rotation axis, respectively.

In one embodiment, the movable body comprises two sets of the second comb electrode units, each set of the second comb electrode unit comprises a plurality of second comb electrodes and the two sets of the second comb electrode units are disposed on the opposite sides of the rotation axis respectively.

In one embodiment, the two sets of the first comb electrode units are electrically isolated for electrodes located on the opposite sides of the rotation axis, and the two sets of the third comb electrode units are electrically isolated for electrodes located on the opposite sides of the rotation axis.

In one embodiment, an electrical potential difference is applied between one of the two sets of the first comb electrode units and one of the two sets of the third comb electrode units, and one of the two sets of the second comb electrode units to drive the movable body to rotate about the rotation axis.

In one embodiment, a periodically varying electrical potential difference is applied between the two sets of the first comb electrode units and the two sets of the third comb electrode units, and the two sets of the second comb electrode units to drive the movable body to rotate about the rotation axis in a bidirectional and reciprocal oscillation motion.

DETAILED DESCRIPTION OF THE PREFERRED EMBODIMENTS

Figure 1A:
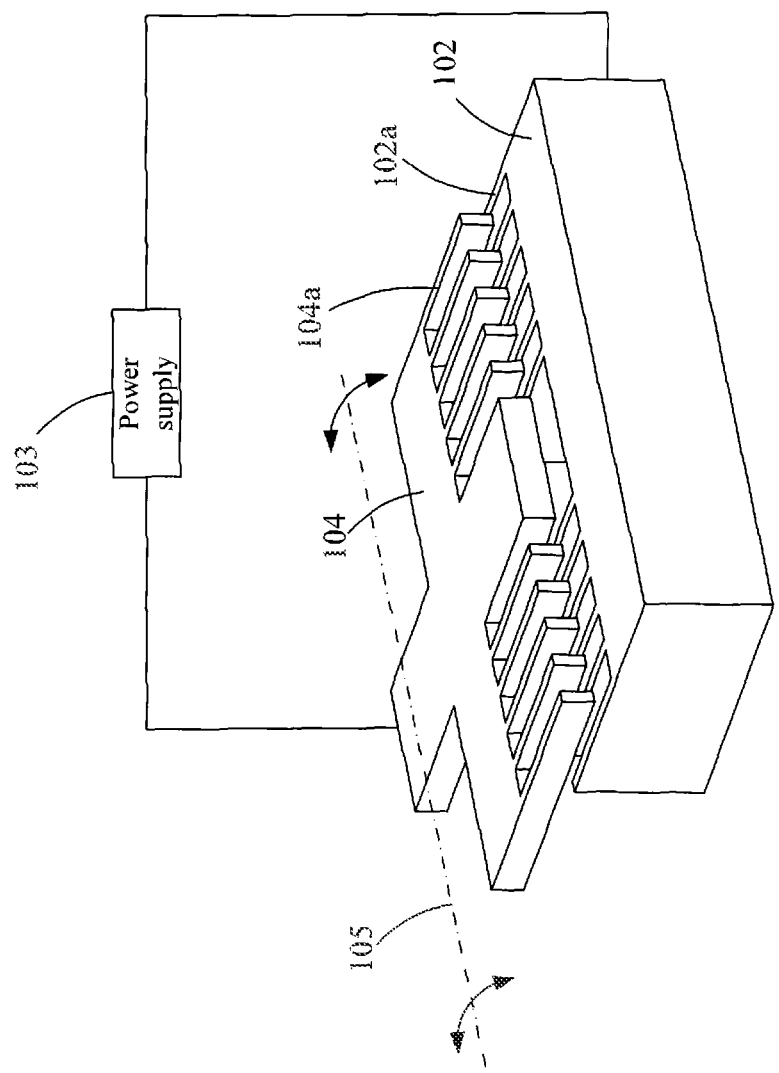
FIG. 1A is a partial schematic three-dimensional view of a conventional vertical comb-drive actuator.
Figure 1B:
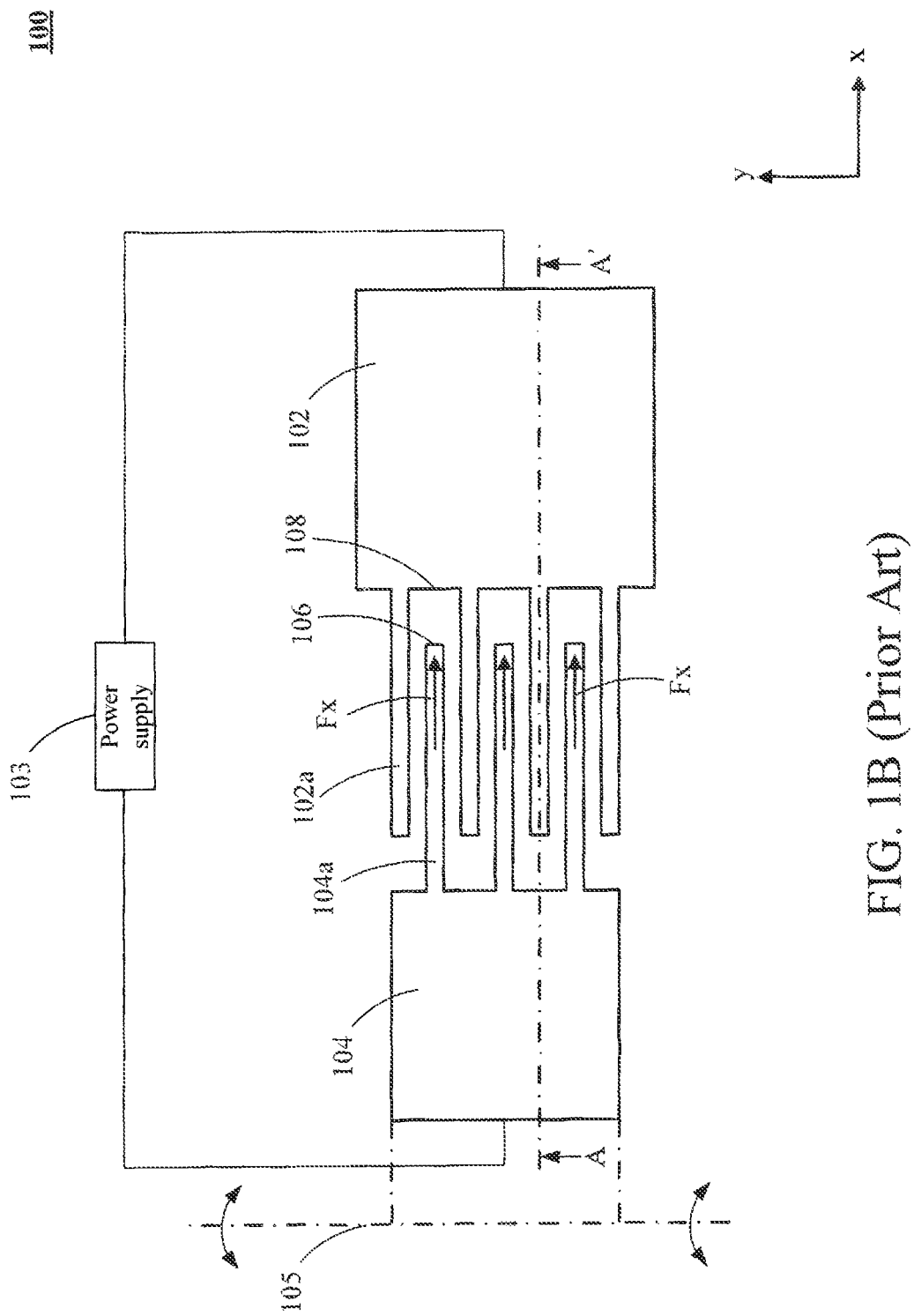
FIG. 1B is a partial schematic top view of the conventional actuator in the FIG. 1A.
Figure 1C:
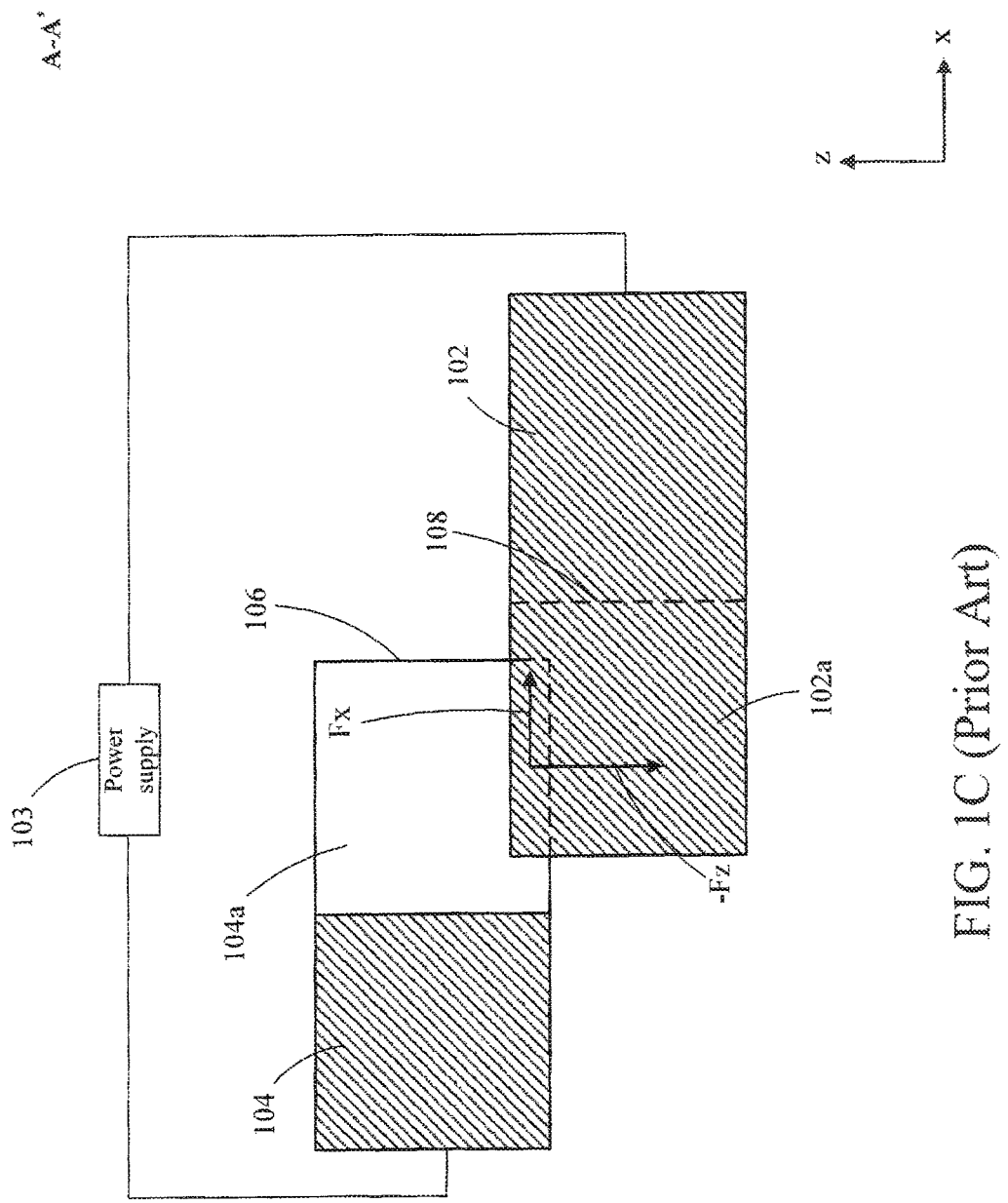
FIGS. 1C-ID are schematic cross-sectional views of the actuator along line A-A' of FIG. 1B when a voltage signal is applied to the conventional actuator.
Figure 1D:
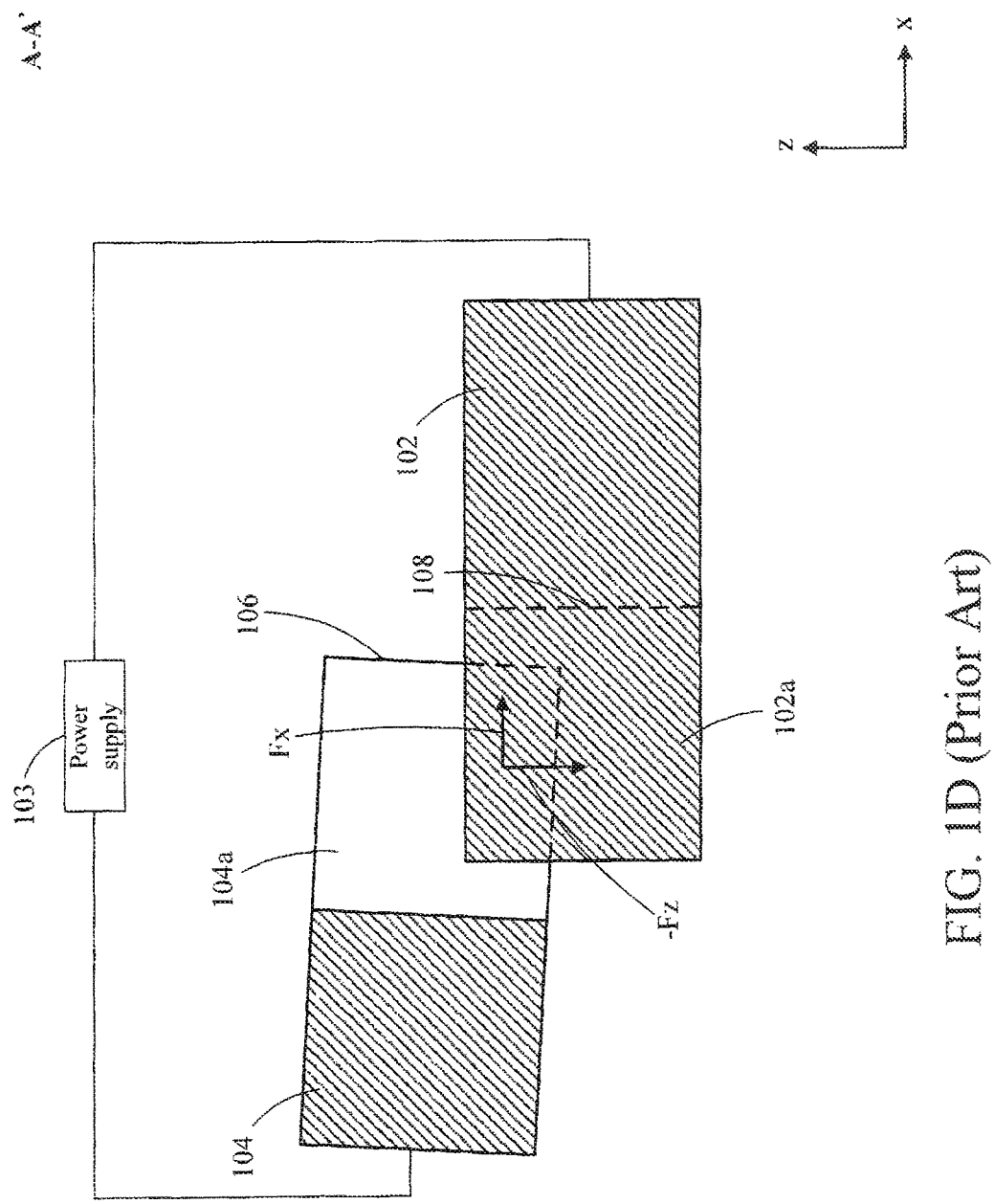

The included drawings are for illustrative purposes and serve only to provide examples of possible structures and arrangements for the disclosed embodiments. These drawings in no way limit any changes in form and detail that may be made to the invention by one skilled in the art without departing from the spirit and scope of the invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

Figure 2:
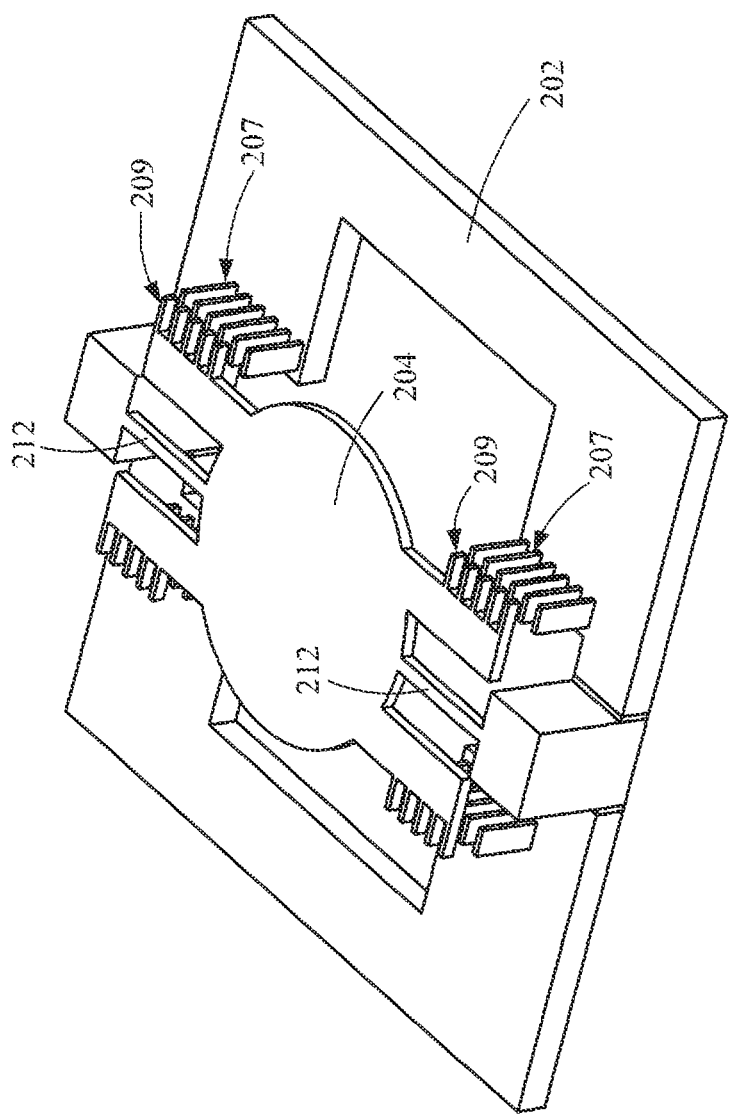
FIG. 2 is a schematic three-dimensional view of a vertical comb-drive actuator according to a first embodiment of the present invention.
Figure 3A:
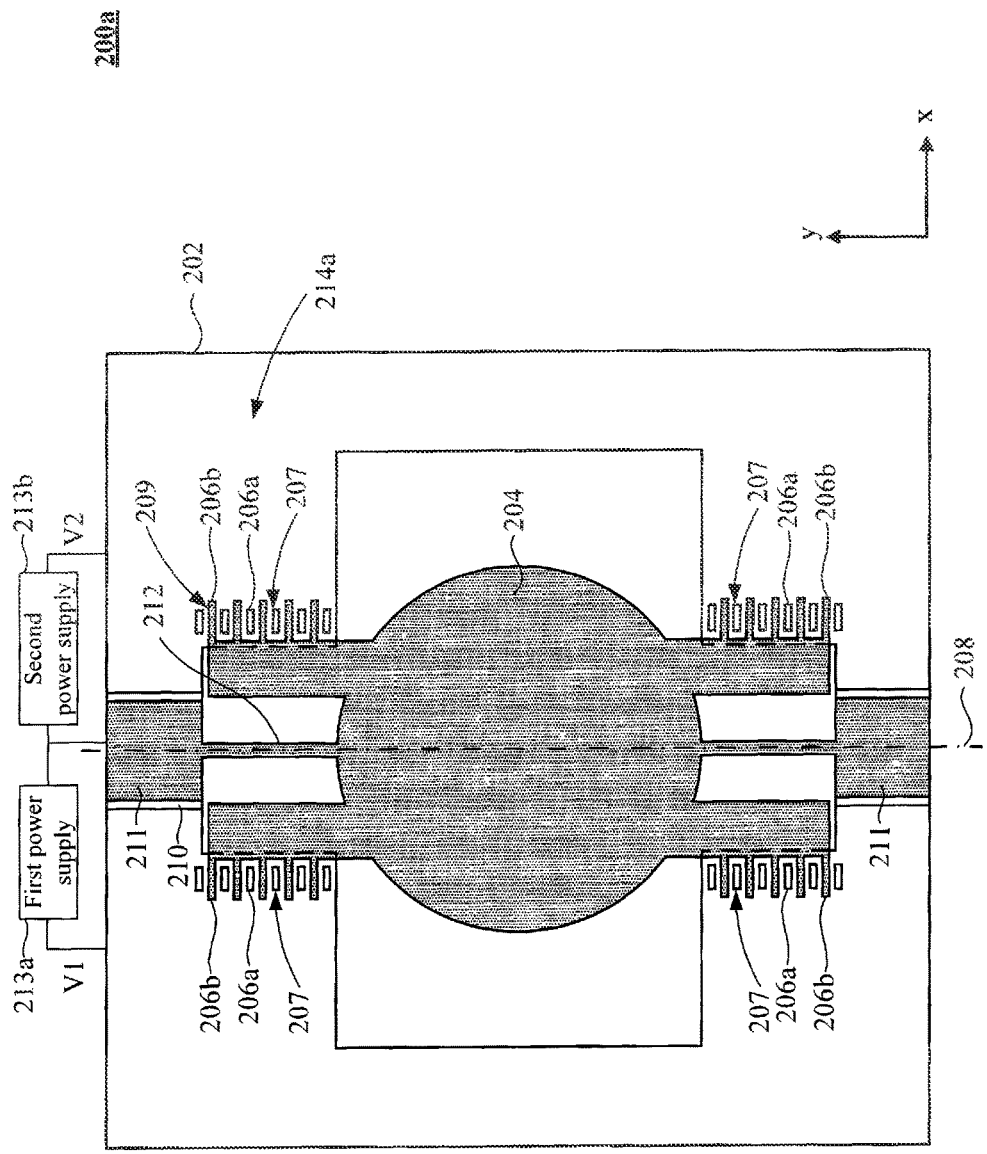
FIG. 3A is a schematic top view of the comb-drive actuator in FIG. 2 according to the first embodiment of the present invention.
Figure 3B:
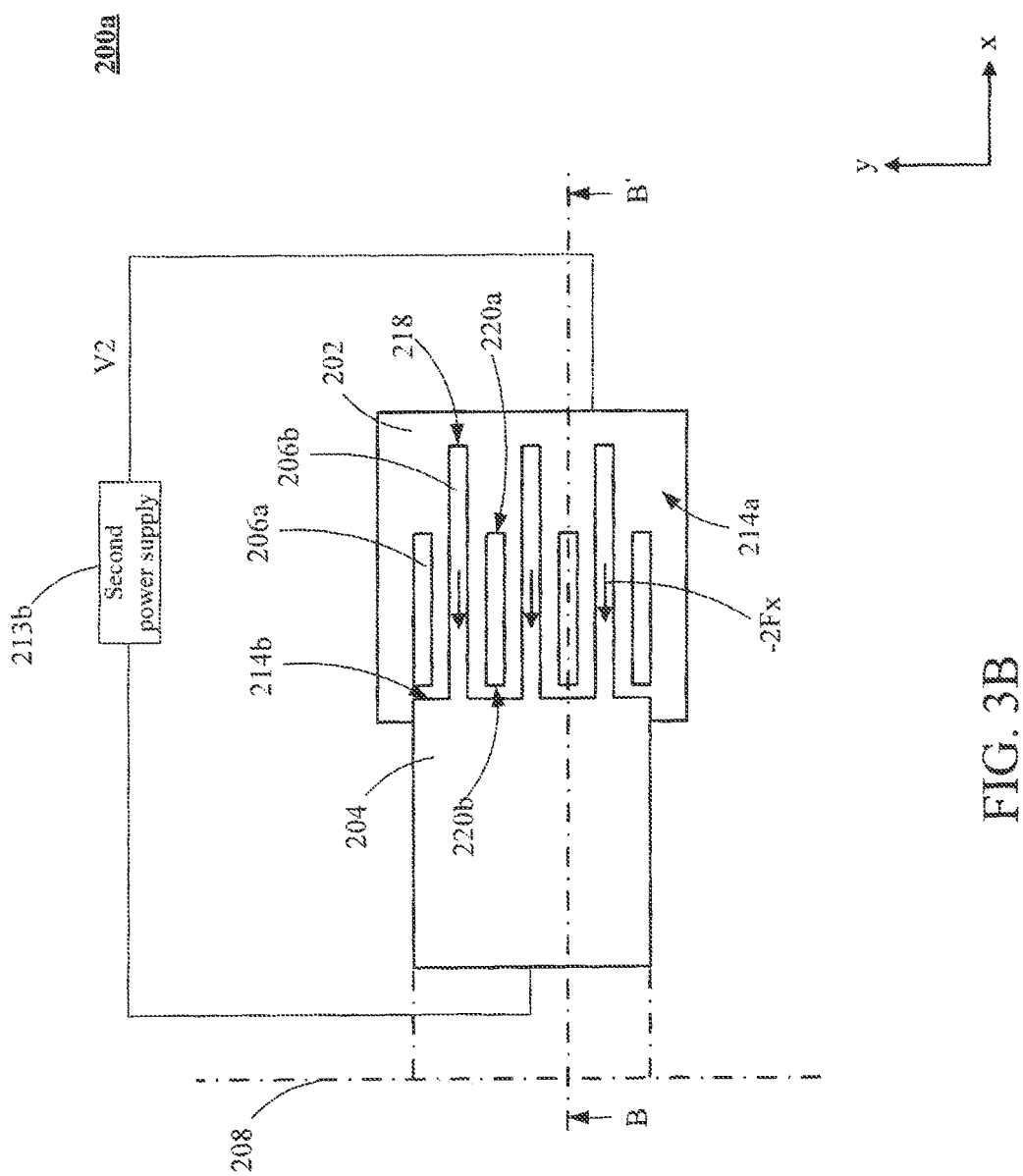
FIG. 3B is a partial schematic top view of the comb-drive actuator in FIG. 2 according to the first embodiment of the present invention.

Please refer to FIGS. 2, 3A and 3B. FIG. 2 is a schematic three-dimensional view of a vertical comb-drive actuator 200a according to a first embodiment of the present invention. FIG. 3A is a schematic plan view of the comb-drive actuator 200a in FIG. 2 according to a first embodiment of the present invention. FIG. 3B is a partial schematic top view of the comb-drive actuator 200a in FIG. 2 according to a first embodiment of the present invention. The comb-drive actuator 200a comprises a support base 202 and a movable body 204. The support base 202 includes at least a plurality of first comb electrodes 206a wherein defined as a first comb electrode unit 207. For example, twenty-four first comb electrodes 206a, but not as a limitation, in FIG. 2 are regarded as a first comb electrode unit 207. The movable body 204 is attached or connected to the support base 202 through a pair of torsion bars 212 wherein the pair of torsion bars 212 defines a rotation axis 208 which is parallel to and/or align with the pair of torsion bars 212. The movable body 204 includes at least a plurality of second comb electrodes 206b wherein defined as a second comb electrode unit 209. For example, twenty second comb electrodes 206b, but not as limitation, in FIG. 2 are regarded as a second comb electrode unit 209. The movable body 204 may rotate about the rotation axis 208 and the second comb electrode unit 209 is interdigitated with the first comb electrode unit 207 correspondingly.

Specifically, the support base 202 and the movable body 204 of the comb-drive actuator 200a in FIGS. 3A and 3B are electrically isolated such that the first comb electrodes 206a and the second comb electrode 206b are electrically isolated. In one case, the support base 202 is electrically isolated from the movable body 204 with an electrical isolation region 210 wherein the first comb electrode unit 207 disposed on the opposite sides of the pair of torsion bars 212 are also electrically isolated from each other. Furthermore, a portion of the movable body 204 serves as an electrode contact pad 211 which is electrically connected to the pair of torsion bars 212. When a first power supply 213a and a second power supply 213b are applied to the support base 202 and the movable body 204, electrical potential differences between the first comb electrodes 206a and the second comb electrode 206b are established and electrostatic forces are generated on the comb-drive actuator 200a such that the movable body 204 may rotate about the rotation axis 208 relative to the support base 202. For example, the first power supply 213a applies a voltage signal V1 to the first comb electrode unit 207 located to the left of the pair of torsion bars 212 and the second power supply 213b applies a voltage signal V2 to the first comb electrode units 207 located to the right of the pair of torsion bars 212 wherein the difference between the voltage signals V1 and V2 is equal to the electrical potential difference and the electrical common ground of the first power supply 213a and the second power supply 213b is electrically connected to the electrode contact pad 211. It should be noted that the first power supply 213a and the second power supply 213b in FIG. 3A may be capable of outputting at least one set of different voltage signals V1 and V2.

In the present invention, the electrostatic driving torque "T" of the comb-drive actuators 200a, 200b and 200c is proportional to the change of the overlapping area "A" over the relative rotation angle "θ" of the interdigitated comb electrodes. The electrostatic driving torque "T" may be expressed by the following equation (1):

$$T \propto \frac{\partial A}{\partial \theta} \tag{1}$$

wherein "T" is the electrostatic driving torque generated by applying electrical potential difference to the comb electrode unit located to the left-hand side (voltage signal V1) and to the comb electrode unit located to the right-hand side (voltage signal V2) of the rotation axis 208 such that the movable body 204 may be rotated relative to the support base 202; "A" is the overlapped area of the interdigitated comb electrodes; and "θ" is the rotation angle of the movable body 204 relative to the support base 202.

Figure 3C:
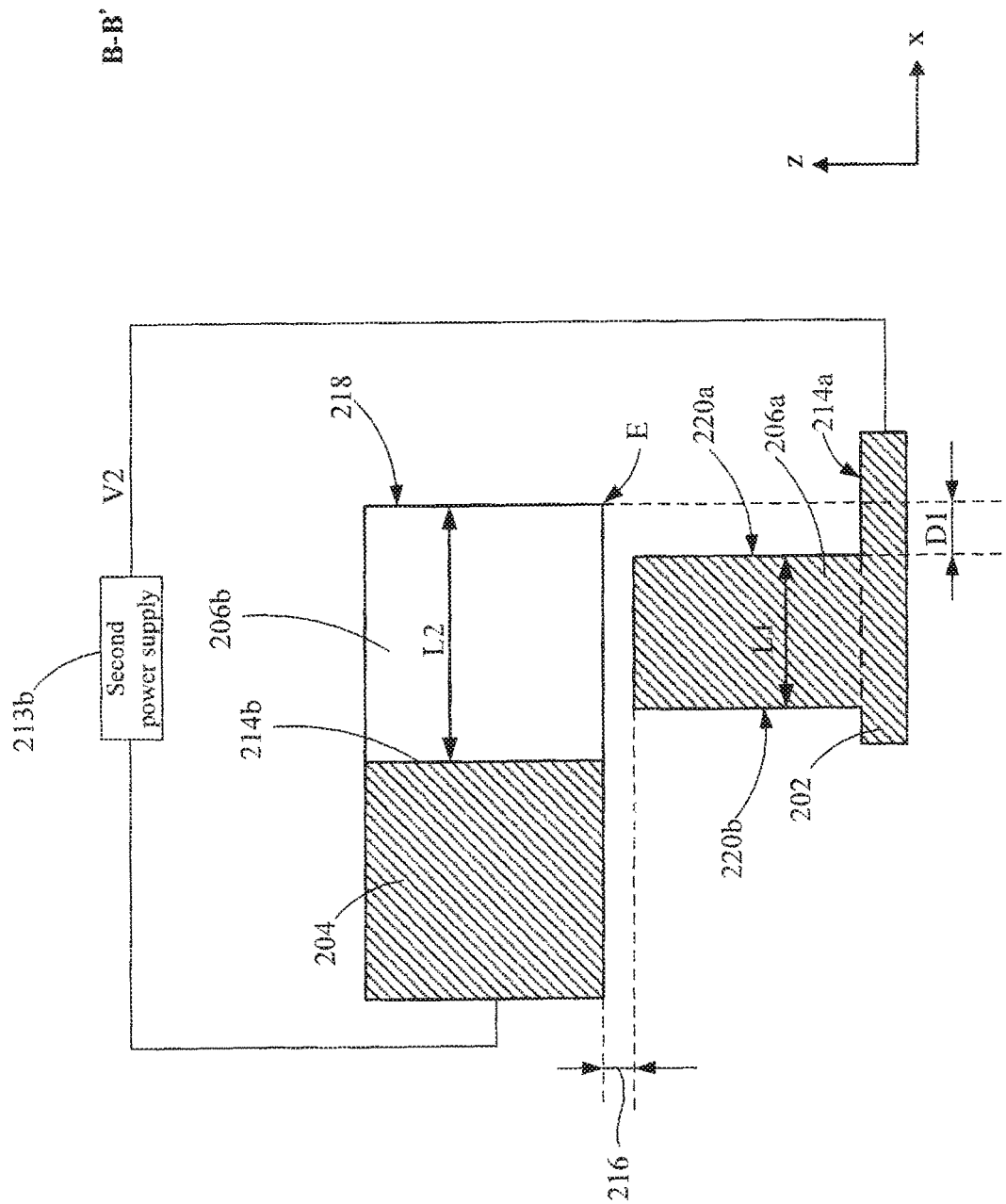
FIG. 3C is a schematic cross-sectional view of the comb-drive actuator in rest position along the line B-B' in FIG. 3B according to the first embodiment of the present invention.
Figure 3D:
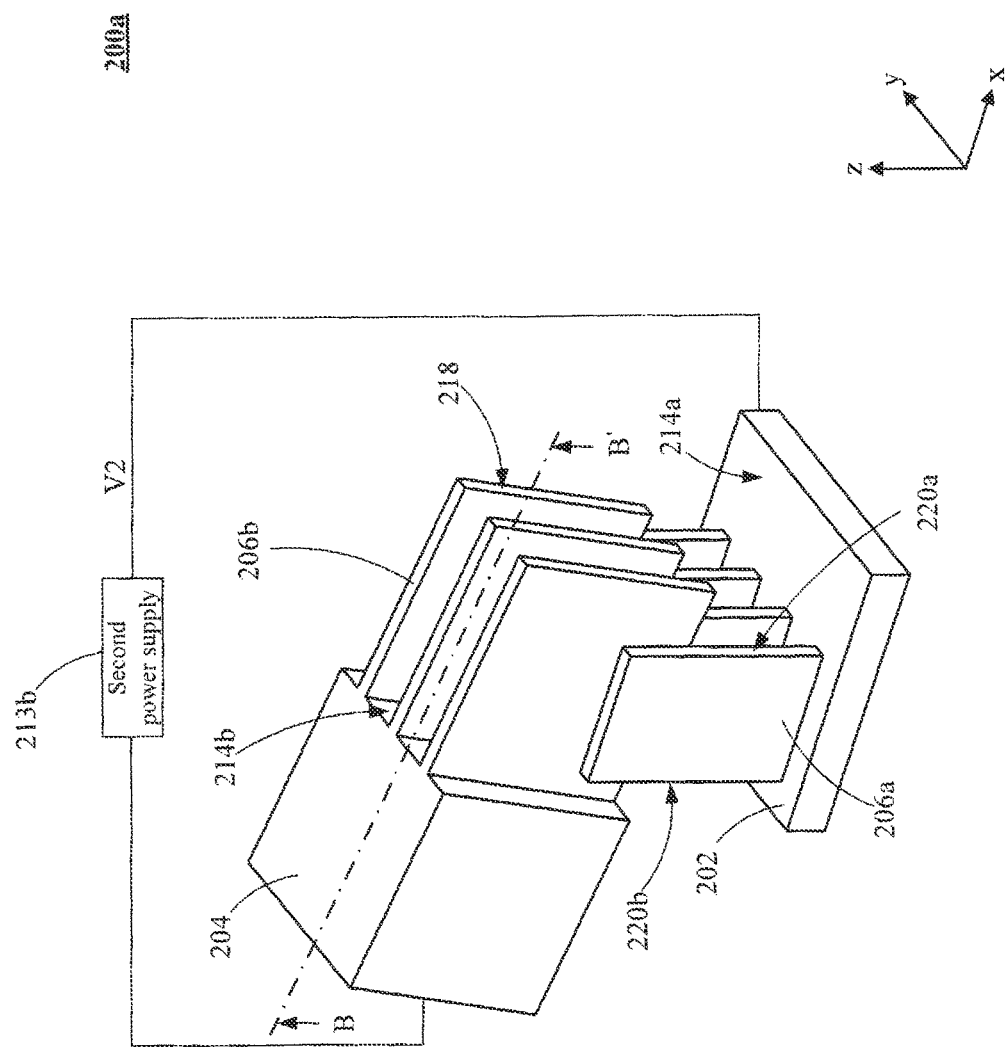
FIG. 3D is a partial schematic three-dimensional view of the comb-drive actuator in a rotated status with an electrical potential difference applied to the comb-drive actuator according to the first embodiment of the present invention.
Figure 3E:
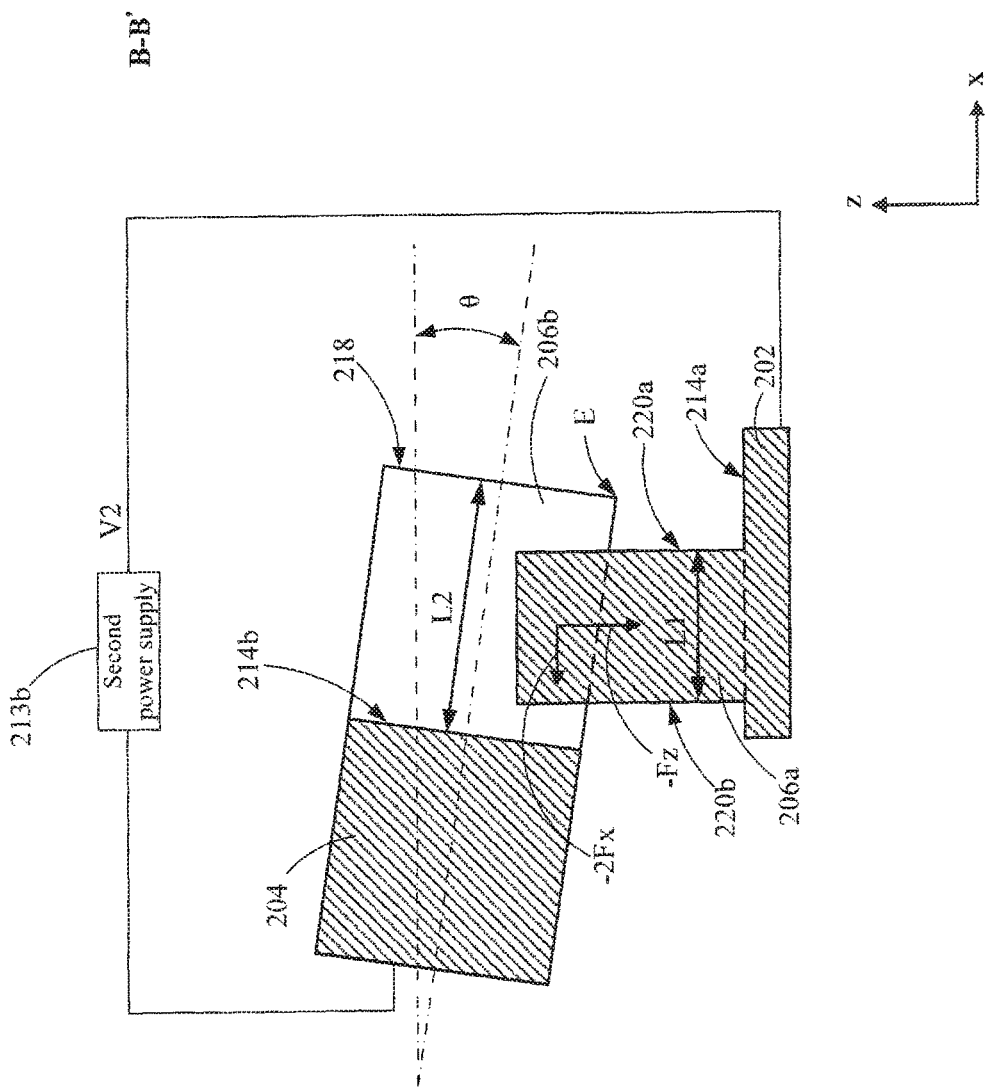
FIG. 3E is a partial schematic cross-sectional view along the line B-B' in FIG. 3D of the comb-drive actuator in a rotated status with an electrical potential difference applied to the comb-drive actuator according to the first embodiment of the present invention.

As shown in FIGS. 3C and 3E of the present invention, the first comb electrodes 206a of the support base 202 remains in a retracted status relative to the second comb electrode 206b in the "x" direction whether the second comb electrode 206b of the movable body 204 is in rest position or in a rotated status when a voltage signal is applied to the comb-drive actuator 200a. The retracted position of the first comb electrodes 206a is capable of reducing the component of the electrostatic force along the "x" direction exerted on the second comb electrode 206b such that the displacement of the second comb electrode 206b along the "x" direction is minimized and the quality of rotation motion of the movable body 204 is improved. Furthermore, the potential electrical short problem between the second comb electrode unit 209 and first comb electrode unit 207 due to excessive motion in the "x" direction is avoided.

FIG. 3C is a schematic cross-sectional view of the comb-drive actuator 200a in rest position along the line B-B' in FIG. 3B according to a first embodiment of the present invention; FIG. 3D is a partial schematic three-dimensional view of the comb-drive actuator 200a in a rotated status with an electrical potential difference applied to the comb-drive actuator 200a according to a first embodiment of the present invention; and FIG. 3E is a partial schematic cross-sectional view of the comb-drive actuator 200a in a rotated status along the line B-B' in FIG. 3D with an electrical potential difference applied to the comb-drive actuator 200a according to a first embodiment of the present invention.

In an embodiment, as shown in FIG. 3A, the support base 202 includes two sets of the first comb electrode units 207, i.e. four units in total, wherein each set of the first comb electrode unit 207 comprises a plurality of first comb electrodes 206a. The two sets of the first comb electrode units 207 are disposed on the opposite sides of the rotation axis 208 respectively, and are electrically isolated from each other. The movable body 204 comprises two sets of the second comb electrode units 209, i.e. four units in total, wherein each set of the second comb electrode unit 209 comprises a plurality of the second comb electrodes 206b and the two sets of the second comb electrode units 209 are disposed on the opposite sides of the rotation axis 208 respectively. The two sets of the first comb electrode units 207 are interdigitated with the two sets of the second comb electrode units 209 correspondingly. It should be noted that the numbers of the first comb electrode unit 207 and the second comb electrode unit 209 are not limited to two.

In an embodiment, as shown in FIGS. 3B and 3C, the support base 202 includes at least a first comb electrode 206a and a first surface 214a wherein the first comb electrode 206a extends perpendicularly from the first surface 214a. The movable body 204 is attached to but electrically isolated from the support base 202 wherein the movable body 204 includes at least a second comb electrode 206b and a second surface 214b wherein the second comb electrode 206b extends perpendicularly from the second surface 214b. The movable body 204 is allowed to rotate about the rotation axis 208 and the first comb electrode 206a is interdigitated with the second comb electrode 206b.

Referring to FIGS. 3B and 3C, the second comb electrode 206b extends along a first direction "x", the rotation axis 208 extends along a second direction "y" and the first comb electrode 206a extends along a third direction "z". As shown in FIG. 3C, the first length L1 is defined as the distance between a first lateral face 220a and a second lateral face 220b of the first comb electrode 206a along the first direction "x", and the second length L2 is defined as the distance between the end surface 218 and the second surface 214b of the second comb electrode 206b along the first direction "x". The first length L1 of the first comb electrode 206a is shorter than the second length L2 of the second comb electrode 206b along the first direction "x". When the movable body 204 is not rotated in a rest position, the distance between the first lateral face 220a of the first comb electrode 206a of the support base 202 and the second surface 214b of the second comb electrode 206b is shorter than the second length L2 wherein the first lateral face 220a is disposed between the second lateral face 220b and the end surface 218. In other words, the first lateral face 220a of the first comb electrode 206a retracts a distance D1 from the end surface 218 of the second comb electrode 206b along the first direction "x". In one embodiment, the first direction "x", the second direction "y", i.e. the rotation axis 208, and the third direction "z" are in different directions, i.e. not collinear. Preferably, the first direction "x", the second direction "y" and the third direction "z" are perpendicular to each other.

Specifically, as shown in FIG. 3C, when the movable body 204 is in rest position and not rotated, the areas of both the first comb electrode 206a and the second comb electrode 206b projected onto the plane "xz" defined by the first direction "x" and the third direction "z" are either partially overlapped or not overlapped. When the movable body 204 is in rest position, a reference interval 216 is defined as the gap between the first comb electrode 206a and the second comb electrode 206b along the third direction "z", as shown in FIG. 3C. If the reference interval 216 is greater than or equal to zero, it represents that the area of the first comb electrode 206a and the area of the second comb electrode 206b projected onto the plane "xz" are not overlapped, and if the reference interval 216 is smaller than zero, it represents that the areas of the first comb electrode 206a and the second comb electrode 206b projected onto the plane "xz" are partially overlapped.

In FIG. 3B to FIG. 3E, when the movable body 204 is rotated from zero degree (rest position) to θ degrees about the rotation axis 208, the first length L1 of the first comb electrode 206a is disposed within the projection region of the second length L2 of the second comb electrode 206b if viewing from the second direction "y". In one preferred embodiment, while the movable body 204 is rotated about the rotation axis 208, the first lateral face 220a is disposed between a lower edge "E" of the end surface 218 and the second lateral face 220b along the first direction "x" wherein the lower edge "E" is approaching the first comb electrode 206a. During rotation of the movable body 204, the first comb electrodes 206a are interdigitated with the second comb electrodes 206b such that the areas of the first comb electrodes 206a and the second comb electrodes 206b projected onto pane "xz" are partially overlapped. The second comb electrode 206b is driven by an electrostatic force with component "−Fx" along the negative direction of the first direction "x" and component "−Fz" along the negative direction of the third direction "z" to rotate the movable body 204 clockwise about the rotation axis 208. It should be noted that the electrostatic force component "−Fx" and the electrostatic force component "−Fz" may vary with the rotation angle "θ". In FIG. 3E, the electrostatic force component "−2Fx" indicates the sum of the electrostatic force components in the first direction "x" exerted on the second comb electrodes 206b. As shown in FIG. 3B, the electrostatic force components "−2Fx" exerted on one single second comb electrode 206b represents the sum of the electrostatic force component "−Fx" along the first direction "x" generated from the two adjacent first comb electrodes 206a. The electrostatic force component "−Fz" indicates that the sum of the electrostatic force components exerted on the second comb electrodes 206b in the third direction "z".

Figure 3F:
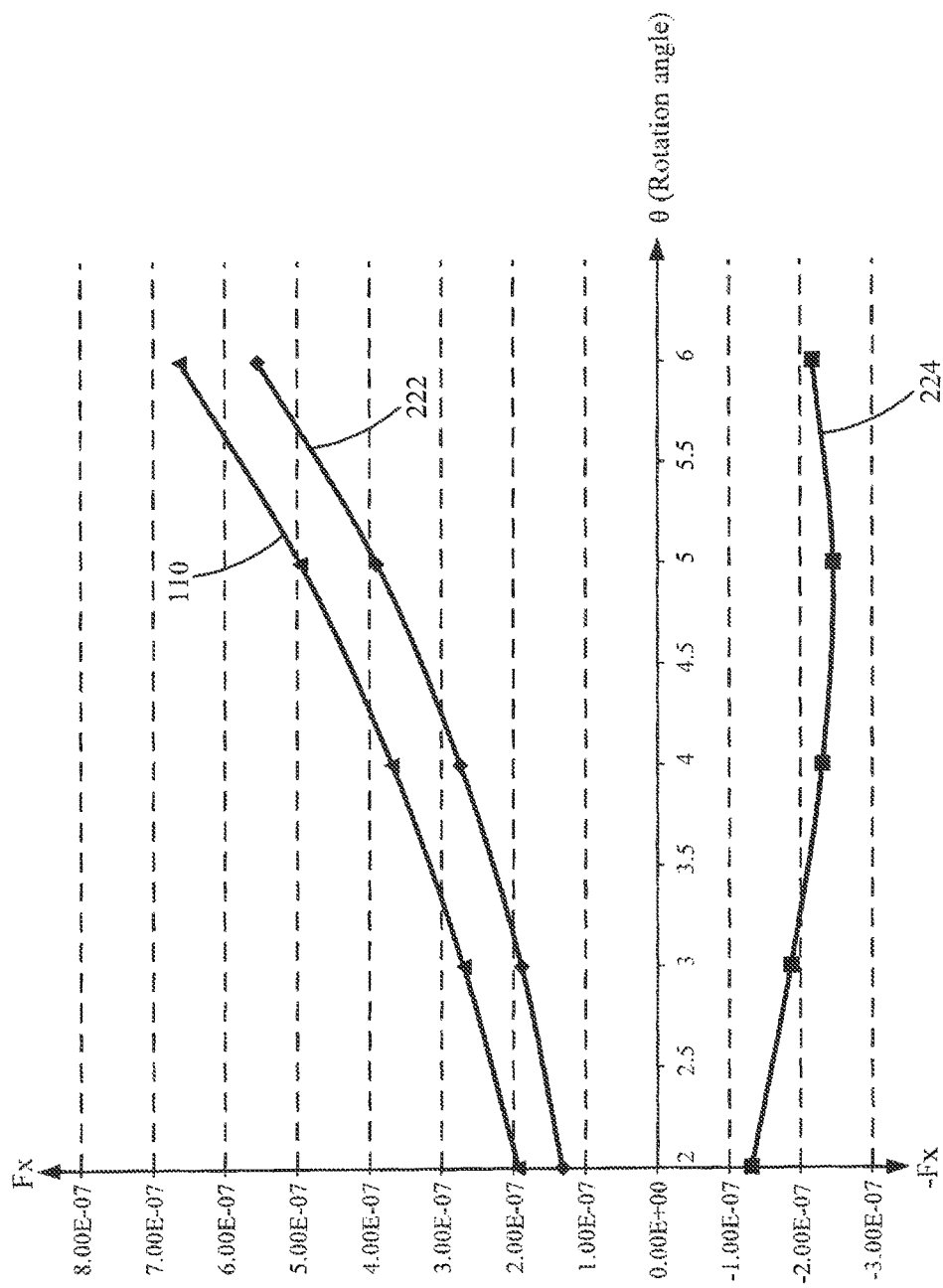
FIG. 3F depicts a relationship between the rotation angle of the movable body and the component of the electrostatic driving force along direction x, "Fx" of the comb-drive actuator when an electrical potential difference is applied to the comb-drive actuator according to the first embodiment of the present invention.

FIG. 3F depicts a relationship between the rotation angle "θ" of the movable body 204 and the electrostatic force component "Fx" when an electrical potential difference is applied to the vertical comb-drive actuator 200a. The first curve 222 represents that the retracted distance D1 of the first lateral face 220a of the first comb electrodes 206a is two length units, e.g. micro-meter (μm). In one case, if the rotation angle "θ" is between 2 to 6 degrees, the electrostatic force component "Fx" is within the range of $1.2 \times 10^{-7}$ to $5.5 \times 10^{-7}$ force units, e.g. micro Newton (μN). The second curve 224 represents that the retracted distance D1 of the first lateral face 220a of the first comb electrodes 206a is twelve length units, e.g. micro-meter (μm). In one case, if the rotation angle "θ" is between 2 through 6 degrees, the electrostatic force component "Fx" is within the range of $-1.2 \times 10^{-7}$ to $-2.5 \times 10^{-7}$ force units, e.g. micro Newton (μN). In a conventional actuator whose end surface of the first comb electrode is without retracting a distance, the electrostatic force component "Fx" is within the range of $2 \times 10^{-7}$ to $6.5 \times 10^{-7}$ force units as shown in the curve 110. Since the electrostatic force component "Fx" of the first curve 222 and second curve 224 is lower than that of the curve 110 in the same rotation angle "θ", the comb-drive actuator 200a in this embodiment advantageously reduces the electrostatic force component "Fx" along the first direction "x", and even change its direction, as shown in the second curve 224, to minimize the horizontal displacement and improve the rotation motion quality of the movable body 204.

In one embodiment, a constant electrical potential difference between the first comb electrode unit 207 and the second comb electrode unit 209 is applied to drive the movable body 204 to rotate about the rotation axis 208 wherein the first comb electrode units 207 disposed on the opposite sides of the pair of torsion bars 212 (shown in FIG. 3A) are electrically isolated. In another embodiment, an electrical potential difference varying periodically between the first comb electrode unit 207 and the second comb electrode unit 209 may be applied to drive the movable body 204 to oscillate about the rotation axis 208 in bidirectional motion. For example, the electrical potential difference varying periodically is a specific periodical waveform signal for controlling the trajectory of the reciprocal oscillation motion of the movable body 204.

Based on the aforementioned descriptions, the first comb electrodes 206a of the support base 202 remains in a retracted status in "x" direction whether the second comb electrode 206b of the movable body 204 is in rest position or in rotated position relative to the first comb electrodes 206a. When applying a voltage signal to the comb-drive actuator 200a, the retracted first comb electrodes 206a is capable of reducing the electrostatic force component along a specific direction, e.g. horizontal direction "x" exerted on the second comb electrode 206b and minimizing the displacement of the second comb electrode 206b in the specific direction so as to improve the quality of rotation motion of the movable body 104.

Figure 4A:
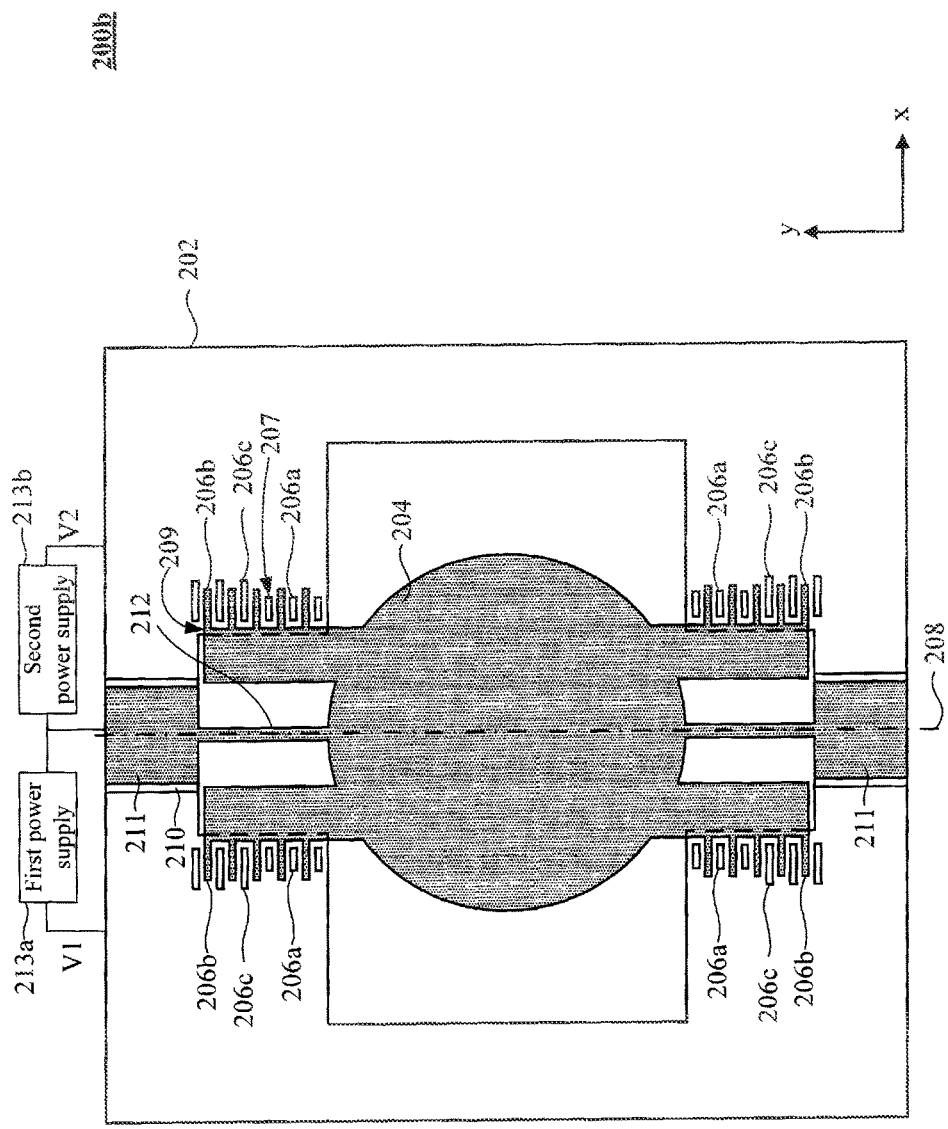
FIG. 4A is a schematic top view of the comb-drive actuator according to a second embodiment of the present invention.
Figure 4B:
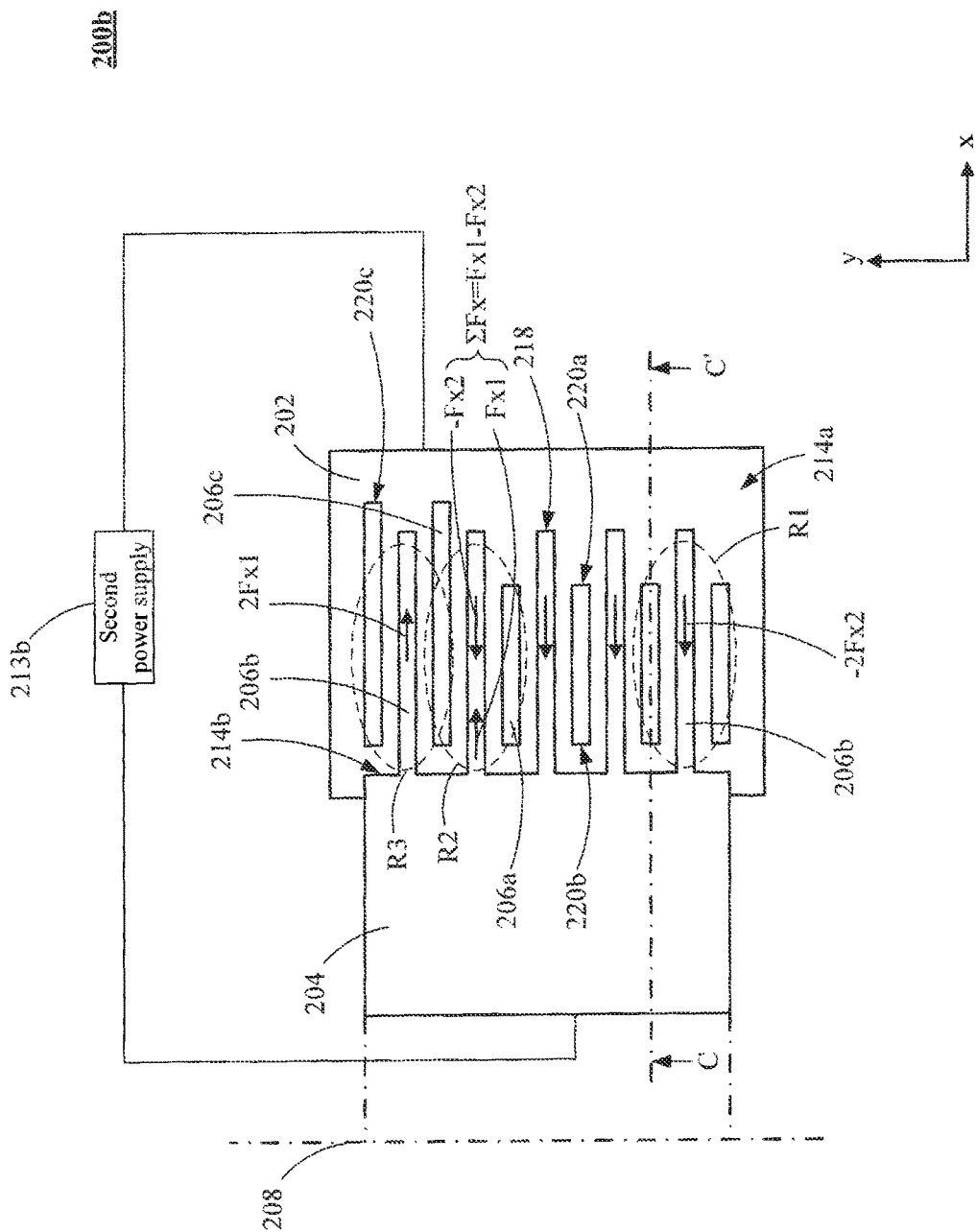
FIG. 4B is a partial schematic top view of the comb-drive actuator in FIG. 4A according to the second embodiment of the present invention.

FIG. 4A is a schematic top view of the vertical comb-drive actuator 200b according to a second embodiment of the present invention, and FIG. 4B is a partial schematic top view of the comb-drive actuator 200b in FIG. 4A according to the second embodiment of the present invention. The comb-drive actuator 200b comprises a support base 202 and a movable body 204. The support base 202 includes at least one first comb electrode 206a (e.g. twelve first comb electrodes 206a, but not limited thereto) and at least one third comb electrode 206c (e.g. twelve third comb electrodes 206c, but not limited thereto) wherein a plurality of the first comb electrodes 206a (e.g. twelve first comb electrodes 206a) and a plurality of the third comb electrodes 206c (e.g. twelve third comb electrodes 206c) are defined as a first comb electrode unit 207. The movable body 204 is connected to the support base 202 through a pair of torsion bars 212 wherein the pair of torsion bars 212 defines a rotation axis 208 which is parallel to and/or overlapped with the pair of torsion bars 212. The movable body 204 includes at least one second comb electrode 206b wherein a plurality of second comb electrodes 206b are defined as a second comb electrode unit 209. As shown in FIG. 4A, twenty second comb electrodes 206b, not limited to, are regarded as one second comb electrode unit 209. The movable body 204 may be rotated about the rotation axis 208 and the second comb electrode unit 209 is interdigitated with the first comb electrode unit 207 correspondingly.

Specifically in the comb-drive actuator 200b in FIGS. 4A and 4B, the support base 202 is electrically isolated from the movable body 204 such that both the first comb electrodes 206a and the third comb electrodes 206c are electrically isolated from the second comb electrode 206b. In one embodiment, the support base 202 is electrically isolated from the movable body 204 with an electrical isolation region 210 wherein the first comb electrode unit 207 disposed on the opposite sides of the pair of torsion bars 212 are electrically isolated. Furthermore, a portion of the movable body 204 serves as an electrode contact pad 211 which is electrically connected to the pair of torsion bars 212. When a first power supply 213a and a second power supply 213b are applied to the support base 202 and the movable body 204, electrical potential differences are established between the first comb electrodes 206a and the second comb electrode 206b, and electrostatic force are generated on the comb-drive actuator 200b such that the movable body 204 may rotate about the rotation axis 208 relative to the support base 202. For example, the first power supply 213a applies a voltage signal V1 to the first comb electrode unit 207 located to the left of the pair of torsion bars 212 and the second power supply 213b applies a voltage signal V2 to the first comb electrode unit 207 located to the right of the pair of torsion bars 212 wherein the difference between the voltage signals V1 and V2 is equal to the electrical potential difference and the electrical common ground of the first power supply 213a and the second power supply 213b is electrically connected to the electrode contact pad 211. It should be noted that the first power supply 213a and the second power supply 213b in FIG. 4A may be capable of outputting at least one set of different voltage signals V1 and V2.

As shown in FIGS. 4A and 4B of the present invention, the first comb electrodes 206a of the support base 202 remains in a retracted status and the third comb electrodes 206c of the support base 202 remains in an protruded status relative to the second comb electrode 206b in the "x" direction whether the second comb electrode 206b of the movable body 204 is in rest position or in a rotated status. If a voltage signal is applied to the comb-drive actuators 200b, the combination of the retracted status of the first comb electrodes 206a and the protruded status of the third comb electrodes 206c is capable of reducing the electrostatic force component of the second comb electrode 206b along a pre-determined direction, e.g. horizontal direction "x" such that the displacement of the second comb electrode 206b along the pre-determined direction is minimized and the quality of rotation motion of the movable body 104 is improved. Furthermore, the potential electrical short problems between the second comb electrode 206b and/or the third comb electrode 206c, and the first comb electrode 206a due to excessive horizontal displacement of the second comb electrode 206b are avoided.

Figure 4C:
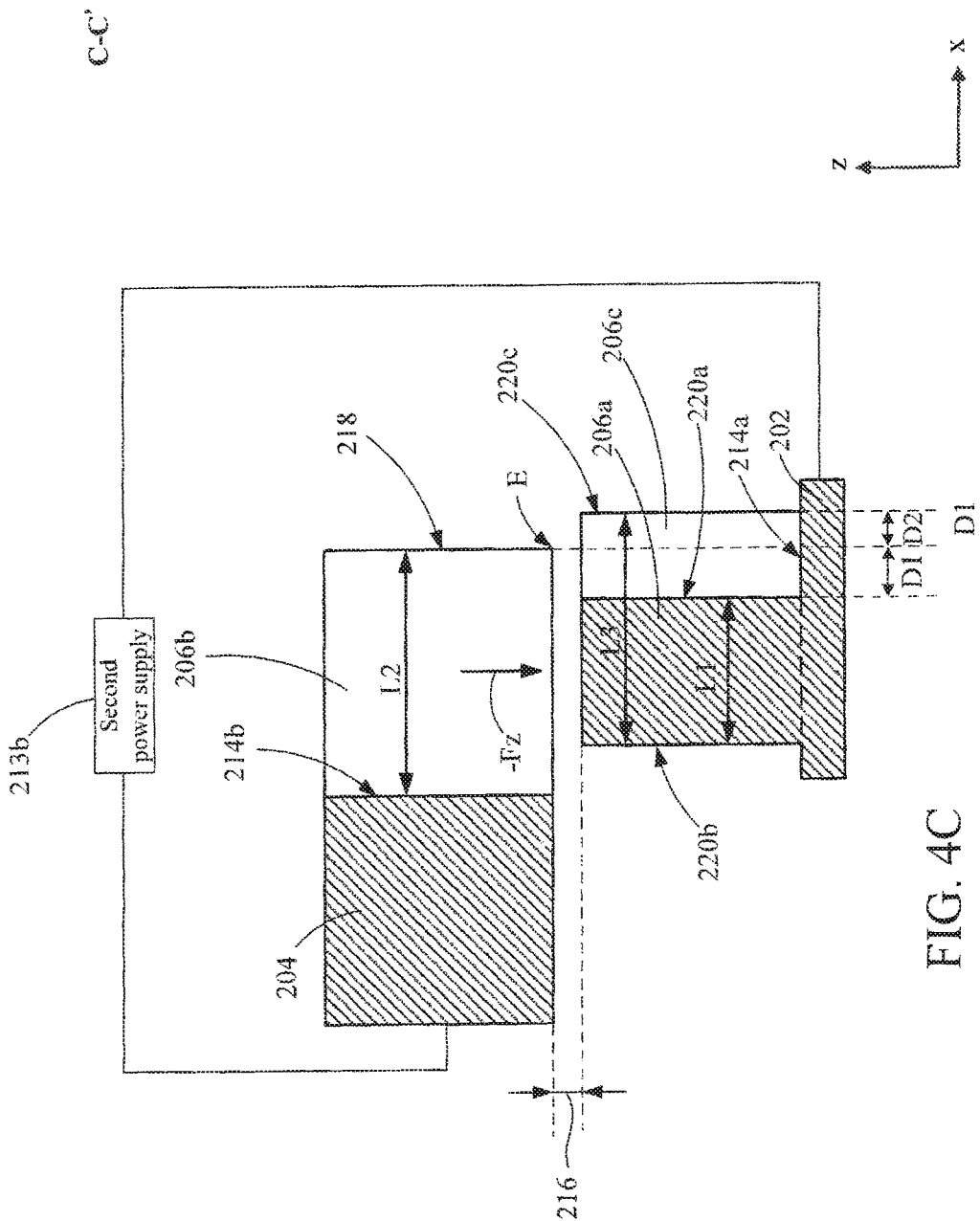
FIG. 4C is a schematic cross-sectional view of the comb-drive actuator along the line C-C' in FIG. 4B when the movable body is in rest position according to the second embodiment of the present invention.
Figure 4D:
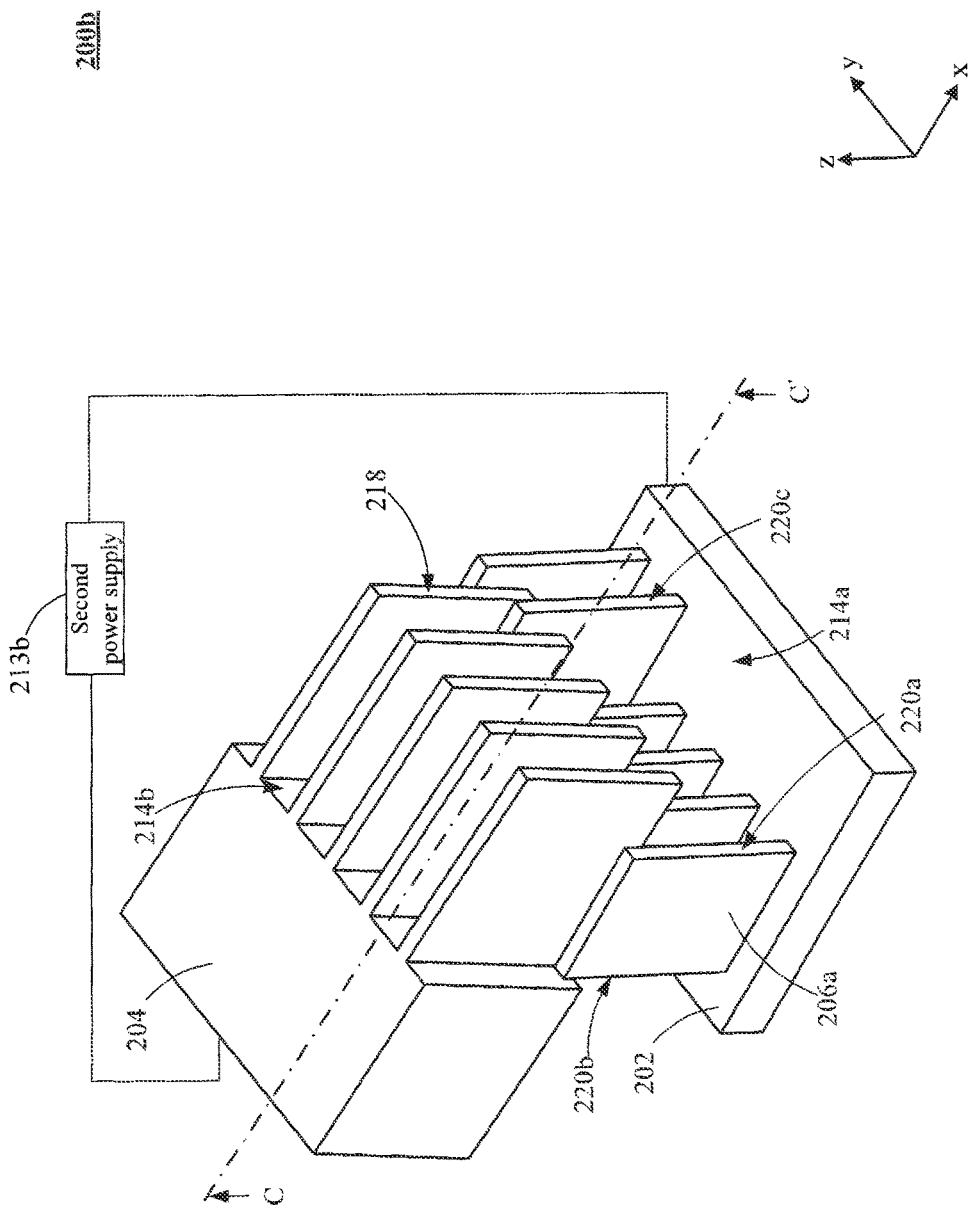
FIG. 4D is a partial schematic three-dimensional view of the comb-drive actuator in a rotated status with an electrical potential difference applied to the comb-drive actuator according to the second embodiment of the present invention.
Figure 4E:
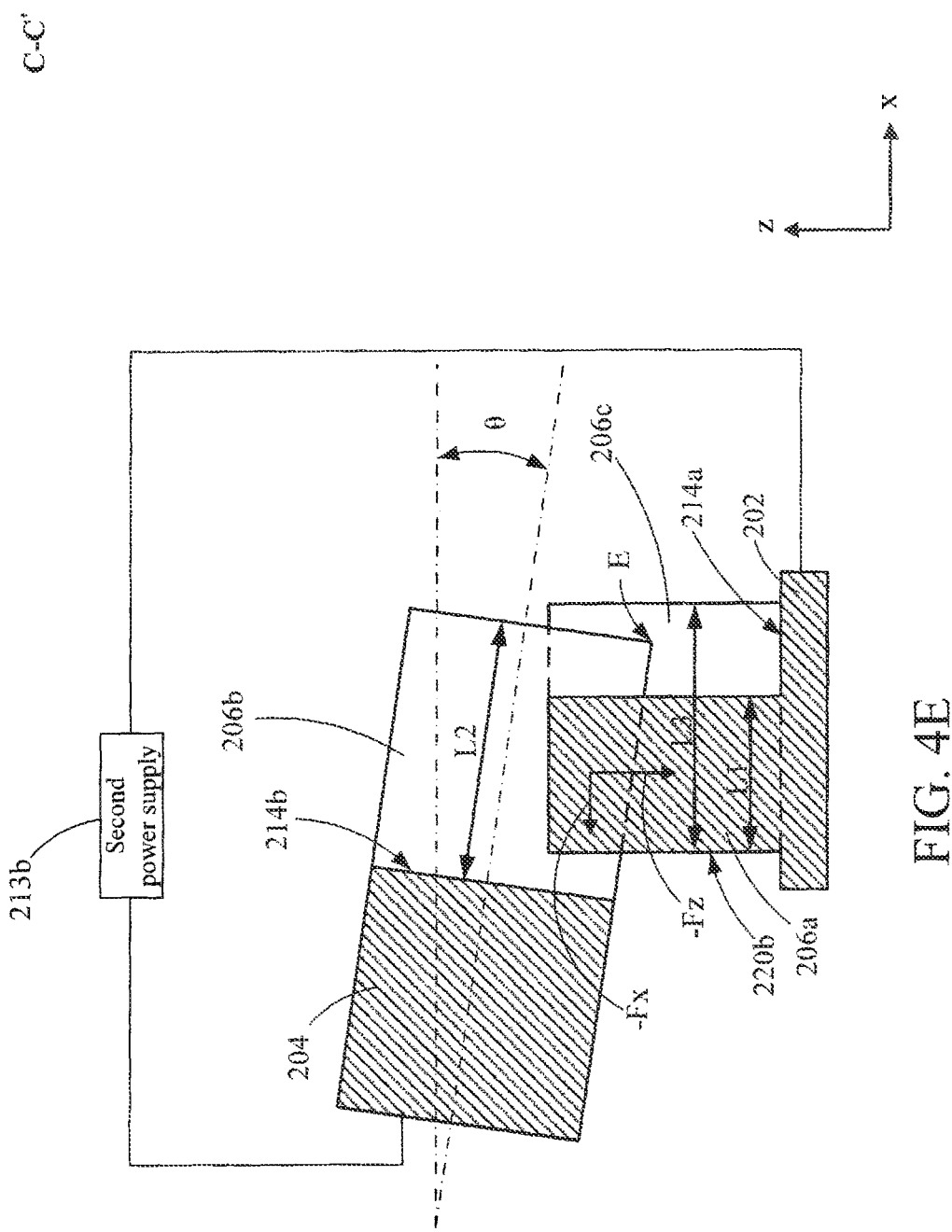
FIG. 4E is a partial schematic cross-sectional view of the comb-drive actuator in a rotated status along the line C-C' in FIG. 4D with an electrical potential difference applied to the comb-drive actuator according to the second embodiment of the present invention.

FIG. 4C is a schematic cross-sectional view of the comb-drive actuator 200b along the line C-C' in FIG. 4B in rest position according to a second embodiment of the present invention; FIG. 4D is a partial schematic three-dimensional view of the comb-drive actuator 200b in a rotated status with an electrical potential difference applied to the comb-drive actuator 200b according to a second embodiment of the present invention; and FIG. 4E is a partial schematic cross-sectional view of the comb-drive actuator 200b along the line C-C' in FIG. 4D in a rotated status with an electrical potential difference applied to the comb-drive actuator 200b according to a second embodiment of the present invention.

In one embodiment, as shown in FIG. 4A, the support base 202 comprises two sets of the first comb electrode units 207, i.e. four units in total, wherein each set of first comb electrode unit 207 comprises a plurality of first comb electrodes 206a and a plurality of third comb electrodes 206c. The two sets of the first comb electrode units 207 are disposed on the opposite sides of the rotation axis 208 respectively, and are electrically isolated to each other. The movable body 204 comprises two sets of the second comb electrode units 209, i.e. four units in total, wherein each set of the second comb electrode unit 209 comprises a plurality of the second comb electrodes 206b, and the two sets of the second comb electrode units 209 are disposed on the opposite sides of the rotation axis 208 respectively. The two sets of the first comb electrode units 207 are interdigitated to the two sets of the second comb electrode units 209 correspondingly. It should be noted that the number of the first comb electrode units 207 and the second comb electrode units 209 are not limited to two.

In one embodiment, as shown of FIGS. 4B and 4C, the support base 202 includes at least one first comb electrode 206a, at least one third comb electrode 206c and a first surface 214a wherein the first comb electrode 206a and the third comb electrode 206c extend perpendicularly from the first surface 214a. The movable body 204 is attached to but electrically isolated from the support base 202 wherein the movable body 204 includes at least one second comb electrode 206b and a second surface 214b wherein the at least one second comb electrode 206b extends perpendicularly from the second surface 214b. The movable body 204 may be rotated about the rotation axis 208 and the at least one first comb electrode 206a and the at least one third comb electrode 206c are interdigitated with the at least one second comb electrode 206b. The first length L1, defined as the distance between a first lateral face 220a and a second lateral face 220b of the first comb electrode 206a along the first direction "x" is different from the third length L3, defined as the distance between a third lateral face 220c and a second lateral face 220b of the third comb electrode 206c along the first direction "x". The first lateral face 220a is disposed between the second lateral face 220b of the first comb electrode 206a and the end surface 218 of the second comb electrode 206b along the first direction "x".

In FIGS. 4B and 4C, the second comb electrode 206b extends along a first direction "x", the rotation axis 208 extends along a second direction "y", and the first comb electrode 206a and the third comb electrode 206c extend perpendicularly from the first surface 214a along a third direction "z". In one embodiment of FIG. 4C, the first length L1 of the first comb electrode 206a along the first direction "x" is shorter than the second length L2 of the second comb electrode 206b along the first direction "x", and the third length L3 of the third comb electrode 206c along the first direction "x" is greater than or equal to the second length L2 of the second comb electrode 206b along the first direction "x". In another embodiment, the first length L1 of the first comb electrode 206a along the first direction "x" is shorter than the second length L2 of the second comb electrode 206b along the first direction "x", and the third length L3 of the third comb electrode 206c along the first direction "x" is shorter than the second length L2 of the second comb electrode 206b along the first direction "x" wherein the first length L1 is shorter than the third length L3. When the movable body 204 is in rest position and not rotated, the distance between the first lateral face 220a of the first comb electrode 206a on the support base 202 and the second surface 214b of the second comb electrode 206b is shorter than the second length L2, defined as the distance between the end surface 218 of second comb electrode 206b of the movable body 204 and the second surface 214b. In other words, the first lateral face 220a of the first comb electrode 206a retracts a distance D1 relative to the end surface 218 of the second comb electrode 206b along the first direction "x". Furthermore, the second length L2 of the second comb electrode 206b is shorter than the distance between the third lateral face 220c of the third comb electrode 206c and the second surface 214b of the second comb electrode 206b along the first direction "x". In other words, the third lateral face 220c of the third comb electrode 206c protrudes a distance D2 relative to the end surface 218 of second comb electrode 206b along the first direction "x". In one embodiment, the first direction "x", the second direction "y", i.e. the rotation axis 208, and the third direction "z" are in different directions, i.e. not collinear directions. Preferably, the first direction "x", the second direction "y" and the third direction "z" are perpendicular to each other.

Specifically, as shown in FIG. 4C, when the movable body 204 is in rest position and not rotated, the areas of both the first comb electrode 206a and the second comb electrode 206b projected onto the plane "xz" defined by the first direction "x" and the third direction "z" are either partially overlapped or not overlapped. In addition, the areas of the third comb electrode 206c and the second comb electrode 206b projected onto the plane "xz" are either partially overlapped or not overlapped. When the movable body 204 is in rest position and not rotated, a reference interval 216 is defined as the gap between the first comb electrode 206a (or the third comb electrode 206c) and the second comb electrode 206b along the third direction "z", as shown in FIG. 4C. If the reference interval 216 is greater than or equal to zero, it represents that the area of the first comb electrode 206a (or the third comb electrode 206c) and the area of the second comb electrode 206b projected onto plane "xz" are not overlapped, and if the reference interval 216 is smaller than zero, it represents that the area of the first comb electrode 206a (or the third comb electrode 206c) and the area of the second comb electrode 206b projected onto plane "xz" are partially overlapped.

In FIG. 4B to FIG. 4E, when the movable body 204 is rotated from zero degree (rest position) to θ degrees about the rotation axis 208, the first length L1 of the first comb electrode 206a is disposed within the projection region of the second length L2 of the second comb electrode 206b if viewing from the second direction "y". In one preferred embodiment, while the movable body 204 is rotated about the rotation axis 208, the first lateral face 220a is disposed between a lower edge "E" of the end surface 218 and the second lateral face 220b along the first direction "x". A portion of the third length L3 of the third comb electrode 206c is disposed within the projection region of the second length L2 of the second comb electrode 206b. The first comb electrodes 206a and the third comb electrodes 206c are interdigitated with the second comb electrodes 206b respectively such that the area of the first comb electrodes 206a and the area of the third comb electrodes 206c projected onto plane "xz" are partially overlapped with the area of the second comb electrodes 206b projected onto plane "xz". The second comb electrode 206b is driven by the electrostatic forces generated between the first comb electrodes 206a and the second comb electrodes 206b, and between the third comb electrodes 206c and the second comb electrodes 206b simultaneously wherein the resultant electrostatic force comprises a component "Fx" in the first direction "x" and a component "Fz" in the third direction "z". The electrostatic forces are capable to drive the movable body 204 to rotate about the rotation axis 208.

It should be noted that, as shown in FIGS. 4B, 4D through 4E, when the movable body 204 is rotated from zero degree to θ degree about the rotation axis 208, the resultant electrostatic force may vary along with the rotation angle "θ". In FIG. 4B, the electrostatic force "ΣFx" represents the sum of electrostatic force components exerted on the second comb electrodes 206b in the first direction "x". For example in region R1 in FIG. 4B, one single second comb electrode 206b is interdigitated with two adjacent first comb electrodes 206a which is retracted by a distance D1 relative to the end surface 218 of the second comb electrode 206b along the first direction "x". When an electrical potential difference is applied to the comb-drive actuator 200b, an electrostatic force component "-Fx2" in the first direction "x" is generated from each side of the second comb electrode 206b so the sum of the electrostatic force components exerted on the second comb electrode 206b in the first direction "x" is equal to "-2Fx2". The minus sign indicates forces are in negative "x" direction. In region R2 in FIG. 4B, one single second comb electrode 206b is interdigitated with one adjacent first comb electrodes 206a and one adjacent third comb electrodes 206c, wherein the first comb electrode 206a is retracted by a distance D1 and the third comb electrode 206c is protruded by a distance D2 from the end surface 218 of second comb electrode 206b along the first direction "x". When an electrical potential difference is applied to the comb-drive actuator 200b, an electrostatic force component "-Fx2" in the first direction "x" is generated from the lower side of the second comb electrode 206b and an electrostatic force component "Fx1" in the first direction "x" is generated from the upper side of the second comb electrode 206b. Therefore, the sum of the electrostatic force component exerted on the second comb electrode 206b in the first direction "x" is "Fx1-Fx2". In region R3 of FIG. 4B, one single second comb electrode 206b is interdigitated with two adjacent third comb electrodes 206c, which are protruded by a distance of D2 from the end surface 218 of the second comb electrode 206b along the first direction "x". When an electrical potential difference is applied to the comb-drive actuator 200b, electrostatic force components "Fx1" in the first direction "x" are generated from the both side of the second comb electrode 206b so the sum of the electrostatic force component exerted on the second comb electrode 206b in the first direction "x" is equal to "2Fx1". It should be noted that the quantities and the configurations of the first comb electrodes 206a and the third comb electrodes 206c may be optimized such that the sum of the electrostatic force components exerted on the second comb electrodes 206b "ΣFx" along the first direction "x" is minimized.

Figure 4F:
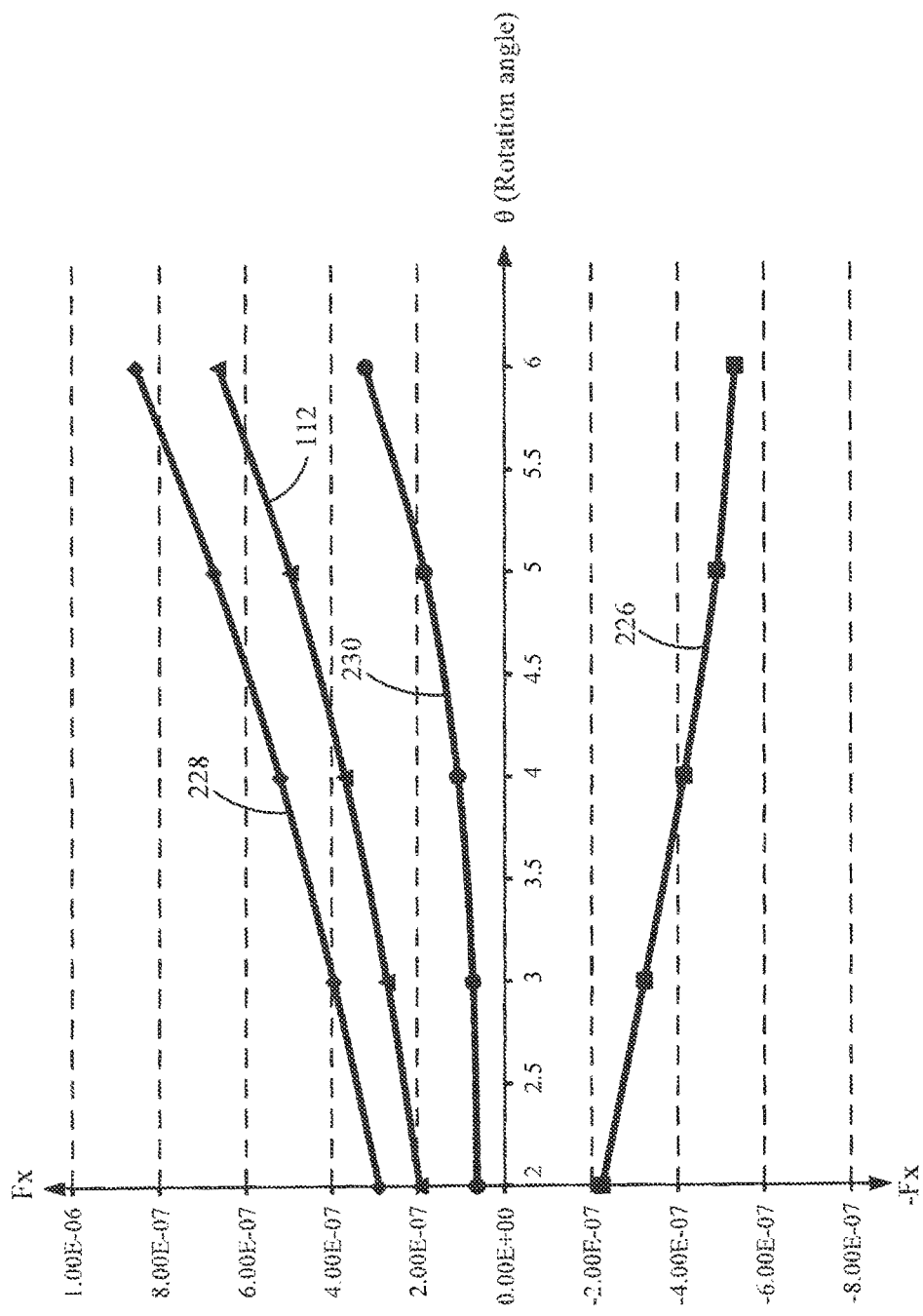
FIG. 4F illustrates a relationship between the rotation angle of the movable body and the component of electrostatic driving force along the direction "x", "Fx" when an electrical potential difference is applied to the comb-drive actuator according to the second embodiment of the present invention.

FIG. 4F depicts a relationship between the rotation angle "θ" of the movable body 204 and the electrostatic force component "Fx" in the first direction "x" when an electrical potential difference is applied to the vertical comb-drive actuator 200b. The third curve 226 represents that the retracted distance D1 of the first lateral face 220a of the first comb electrodes 206a is twenty length units, e.g. micrometer (μm). In one case, if the rotation angle "θ" is between 2 to 6 degrees, the electrostatic force component "Fx" is within the range of $-2.0 \times 10^{-7}$ to $-5.5 \times 10^{-7}$ force units, e.g. micro Newton (μN). The fourth curve 228 represents that the protruded distance D2 of the third lateral face 220c of the third comb electrodes 206c is three length units, e.g. micrometer (μm). In one case, if the rotation angle "θ" is between 2 to 6 degrees, the electrostatic force component "Fx" is within the range of $2.5 \times 10^{-7}$ to $8.5 \times 10^{-7}$ force units.

The fifth curve 230 represents the sum of the electrostatic force components "Fx" of the third curve 226 and of the fourth curve 228 along the first direction "x" in the corresponding rotation angle which is within the range of $0.5 \times 10-7$ to $3.0 \times 10-7$ force units as shown in FIG. 4F. In comparison with the third curve 226 and the fourth curve 228, the electrostatic force component "Fx" of the fifth curve 230 is much closer to zero for rotation angle between 0 to 6 degrees. Therefore, the sum of the electrostatic force components "Fx" which affects the quality of the rotation motion of the movable body 204 is minimized. In comparison with a conventional vertical comb-drive actuator whose end surface of the first comb electrode is without retracting by a distance, the electrostatic force component "Fx" along the first direction is within the range between $2 \times 10-7$ to $6.5 \times 10-7$ force units for rotation angle between 2 to 6 degrees as shown in the second curve 112. Under the same rotation angle "θ", the sum of the electrostatic force components along the first direction "x" in the fifth curve 230 is substantially lower than that in the second curve 112; thus, the comb-drive actuator 200b of the present invention is capable of reducing the sum of the electrostatic force components along the first direction "x" and minimizing the displacement of the movable body 204 along the first direction "x". Therefore, the electrical short problem between the second comb electrodes 206b and the first comb electrodes 206a and the third comb electrodes 206c due to excessive lateral displacement of the second comb electrode 206b can be avoided.

In one embodiment, a constant electrical potential difference is applied between the first comb electrode unit 207 and the second comb electrode unit 209 to drive the movable body 204 to rotate about the rotation axis 208 wherein the first comb electrode units 207 disposed in the opposite sides of the pair of torsion bars 212 (shown in 4A) are electrically isolated. In another embodiment, an electrical potential difference varying periodically between the first comb electrode unit 207 and the second comb electrode unit 209 may be applied to drive the movable body 204 to oscillate about the rotation axis 208 in bidirectional motion. For example, the electrical potential difference varying periodically is a specific periodical waveform signal for controlling the trajectory of the reciprocal oscillation motion.

Based on the aforementioned descriptions, the first comb electrodes 206a of the support base 202 remains in a retracted status in "x" direction, and the third comb electrodes 206c of the support base 202 remains in a protruded status in "x" direction whether the second comb electrode 206b of the movable body 204 is in rest position or in a rotated position relative to the first comb electrodes 206a. When applying a voltage signal to the comb-drive actuator 200a, the retracted first comb electrodes 206a and the protruded third comb electrodes 206c are capable of reducing the electrostatic force component along a specific direction, e.g. horizontal direction "x" exerted on the second comb electrode 206b and minimizing the displacement of the second comb electrode 206b from the displacement in the specific direction so as to improve the quality of rotation motion of the movable body 104. Therefore, the electrical short problem between the second comb electrodes 206b and the first comb electrodes 206a and the third comb electrodes 206c due to excessive lateral displacement of the second comb electrode 206b can be avoided.

Figure 5:
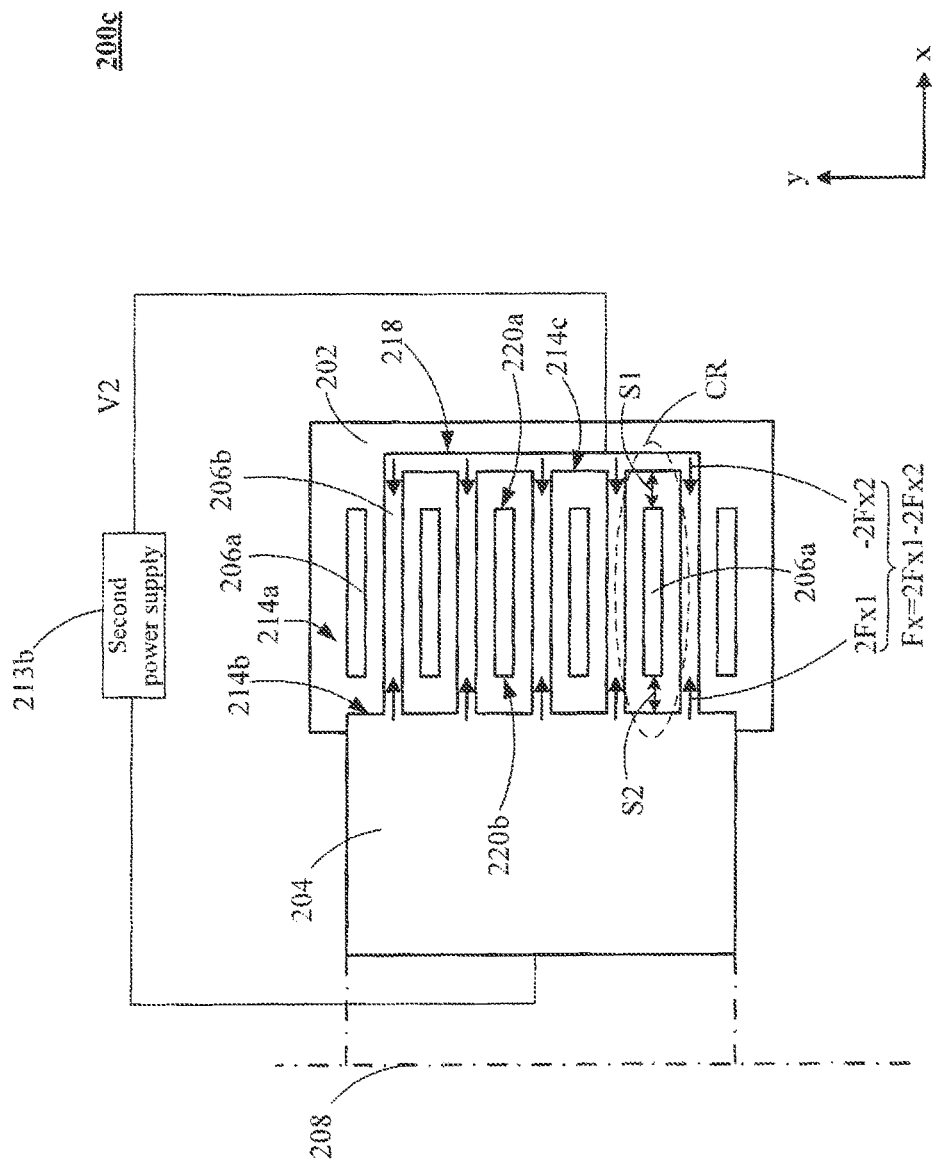
FIG. 5 is a partial schematic top view of the comb-drive actuator according to a third embodiment of the present invention.

FIG. 5 depicts a partial schematic top view of the comb-drive actuator 200c according to a third embodiment of the present invention. The comb-drive actuator 200c is similar to the comb-drive actuator 200a in the first embodiment but the difference is that the second comb electrode 206b in the third embodiment forms a closed region CR on the plane "xy" to surround a portion or all of the first comb electrodes 206a. In other words, the end surfaces 218 of the second comb electrode 206b are interconnected and located beyond the first lateral face 220a of the first comb electrode 206a in the first direction "x". In FIG. 5, the support base 202 includes at least one first comb electrode 206a and a first surface 214a wherein the first comb electrode 206a extends perpendicularly from the first surface 214a. The movable body 204 is mechanically attached to but electrically isolated from the support base 202. The movable body 204 includes at least one second comb electrode 206b and a second surface 214b wherein the second comb electrode 206b extends perpendicularly from the second surface 214b. The movable body 204 is allowed to rotate about the rotation axis 208 and the first comb electrode 206a is interdigitated with the second comb electrode 206b. The end surfaces 218 of the second comb electrodes 206b are connected to form a closed region CR between two adjacent second comb electrodes 206b. Namely, viewing from the top of plane "xy", two adjacent second comb electrodes 206b, a second surface 214b and an end surface 218 form a closed region CR which surrounds a portion or all of the first comb electrodes 206a. As shown in FIG. 5, the two outmost first comb electrodes 206a in the support base 202 are disposed outside the closed region CR and the rest of four first comb electrodes 206a are disposed within the closed region CR. In each closed region CR, when an electrical potential difference is applied to the comb-drive actuator 200c, an electrostatic force component along the positive "x" direction "Fx1" and an electrostatic force component along the negative "x" direction "−Fx2" are generated and exerted on the second comb electrode 206b from the neighboring first comb electrode 206a. Thus, the sum of the electrostatic force components along the "x" direction exerted on the second comb electrode 206b in one closed region CR is "(2Fx1-2Fx2)". In one embodiment, if the first interval S1 defined as the distance between the first lateral face 220a and the third surface 214c is equal to the second interval S2 defined as the distance between the second lateral face 220b and the second surface 214b, the sum of the electrostatic force components "(2Fx-2Fx2)" is minimized to near zero. In another embodiment, if the first interval S1 is not equal to (greater than or smaller than) the second interval S2, the sum of the electrostatic force components "(2Fx1-2Fx2)" may be reduced but may not approach to zero. For the third embodiment of the present invention, the sum of the electrostatic force components along the "x" direction and exerted on the second comb electrodes 206b under various rotation angles is smaller than that of the conventional vertical comb-drive actuator.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A comb-drive actuator, comprising:
a support base, comprising a plurality of first comb electrodes and a first surface wherein each of the first comb electrodes extends from the first surface; and
a movable body attached to the support base and comprising a plurality of second comb electrodes and a second surface wherein each of the second comb electrodes extends from the second surface wherein the movable body is allowed to rotate about a rotation axis and each of the second comb electrode is interdigitated with each of the first comb electrodes;
wherein each of the second comb electrodes extends along a first direction, the rotation axis extends along a second direction, each of the first comb electrodes extends along a third direction, wherein the first direction, the second direction, and the third direction are perpendicular to each other;
wherein a distance between a first lateral face of each first comb electrode of the support base and the second surface is shorter than a second length defined as a distance between an end surface of each second comb electrode of the movable body and the second surface, and the first lateral face is disposed between a second lateral face of each first comb electrode and the end surface along the first direction;
wherein the support base further comprises a plurality of third comb electrodes extending from the first surface, and a distance between a third lateral face of each third comb electrode and the second surface is longer than the second length between the end surface of each second comb electrode and the second surface;

wherein the second lengths of every two second comb electrodes that are arranged next to each other are the same along the first direction, and at least one of the first comb electrodes is between a pair of second comb electrodes that are arranged next to each other and at least one of the third comb electrodes is between a pair of second comb electrodes that are arranged next to each other.

2. The comb-drive actuator of claim 1, wherein when the movable body is not rotated in rest position, a first length of each first comb electrode along the first direction is shorter than the second length of each second comb electrode along the first direction and the first length is defined as a distance between the first lateral face and the second lateral face, and wherein the first lengths of the first comb electrodes are the same along the first direction.

3. The comb-drive actuator of claim 1, wherein when the movable body is not rotated in rest position, the distance between the first lateral face of each first comb electrode of the support base and the second surface is shorter than the second length.

4. The comb-drive actuator of claim 1, wherein when the movable body is not rotated in rest position, an area of each first comb electrode and an area of each second comb electrode projected onto a plane defined by the first direction and the third direction are either partially overlapped or not overlapped.

5. The comb-drive actuator of claim 1, wherein when the movable body is rotated about the rotation axis, a first length of each first comb electrode along the first direction is shorter than the second length of each second comb electrode along the first direction.

6. The comb-drive actuator of claim 1, wherein when the movable body is rotated about the rotation axis, the first lateral face is disposed between a lower edge of the end surface and the second lateral face along the first direction, and wherein the lower edge is approaching each first comb electrode.

7. The comb-drive actuator of claim 1, wherein a first length of each first comb electrode along the first direction is shorter than a third length of each third comb electrode, wherein the first length is defined as a distance between the first lateral face and the second lateral face of each first comb electrode, and wherein the third length is defined as a distance between a third lateral face and a second lateral face of each third comb electrode along the first direction, and wherein the third lengths of the third comb electrode are the same along the first direction.

8. The comb-drive actuator of claim 1, wherein the support base comprises two sets of first comb electrode units, each set of the first comb electrode units comprises a plurality of first comb electrodes and the two sets of the first comb electrode units are disposed on the opposite sides of the rotation axis, and two sets of third comb electrodes units, each set of the third comb electrode units comprises a plurality of third comb electrodes and the two sets of the third comb electrode units are disposed on the opposite sides of the rotation axis, respectively.

9. The comb-drive actuator of claim 8, wherein the movable body comprises two sets of second comb electrode units, each set of the second comb electrode unit comprises a plurality of second comb electrodes and the two sets of the second comb electrode units are disposed on the opposite sides of the rotation axis respectively.

10. The comb-drive actuator of claim 8, wherein the two sets of the first comb electrode units are electrically isolated for electrodes located on the opposite sides of the rotation axis, and the two sets of the third comb electrode units are electrically isolated for electrodes located on the opposite sides of the rotation axis.

11. The comb-drive actuator of claim 10, wherein an electrical potential difference is applied between one of the two sets of the first comb electrode units and one of the two sets of the third comb electrode units, and one of the two sets of the second comb electrode units to drive the movable body to rotate about the rotation axis.

12. The comb-drive actuator of claim 10, wherein a periodically varying electrical potential difference is applied between the two sets of the first comb electrode units and the two sets of the third comb electrode units, and the two sets of the second comb electrode units to drive the movable body to rotate about the rotation axis in a bidirectional and reciprocal oscillation motion.

13. The comb-drive actuator of claim 1, wherein the movable body is attached to the support base by torsion bars such that the movable body is allowed to rotate about the rotation axis of the torsion bars.

* * * * *